US010064501B2

(12) United States Patent
Hester-Redmond

(10) Patent No.: US 10,064,501 B2
(45) Date of Patent: Sep. 4, 2018

(54) MODULAR SHELF ASSEMBLY FOR A COSMETIC FIXTURE SYSTEM

(71) Applicant: Wal-Mart Stores, Inc., Bentonville, AR (US)

(72) Inventor: Sunshine Rae Hester-Redmond, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 69 days.

(21) Appl. No.: 14/580,630

(22) Filed: Dec. 23, 2014

(65) Prior Publication Data

US 2015/0173529 A1 Jun. 25, 2015

Related U.S. Application Data

(60) Provisional application No. 61/920,426, filed on Dec. 23, 2013, provisional application No. 61/920,388, filed on Dec. 23, 2013.

(51) Int. Cl.
| | |
|---|---|
| *A47F 1/12* | (2006.01) |
| *A47F 5/08* | (2006.01) |
| *A47F 5/00* | (2006.01) |
| *F21V 33/00* | (2006.01) |
| *H02G 3/38* | (2006.01) |
| *F21W 131/301* | (2006.01) |
| *H02G 3/04* | (2006.01) |

(52) U.S. Cl.
CPC .............. *A47F 1/126* (2013.01); *A47F 1/125* (2013.01); *A47F 5/0025* (2013.01); *A47F 5/08* (2013.01); *F21V 33/0012* (2013.01); *H02G 3/388* (2013.01); *F21W 2131/301* (2013.01); *H02G 3/045* (2013.01); *Y10T 29/49117* (2015.01)

(58) Field of Classification Search
CPC ........ A47F 1/126; A47F 1/125; A47F 5/0025; A47F 5/08; H02G 3/388; H02G 3/045; F21V 33/0012; Y10T 29/49117; F21W 2131/301
USPC ...................................................... 211/59.3
See application file for complete search history.

(56) References Cited

U.S. PATENT DOCUMENTS

| | | |
|---|---|---|
| 3,640,389 A | 2/1972 | Snyder |
| 3,836,936 A | 9/1974 | Clement |

(Continued)

*Primary Examiner* — Ko H Chan
(74) *Attorney, Agent, or Firm* — McCarter & English, LLP; David R. Burns

(57) ABSTRACT

Exemplary embodiments of the present disclosure relate to a reconfigurable shelf assembly. The reconfigurable shelf assembly can include a base frame and a first shelving component configured to support objects according to a first configuration. The first shelving component can be detachably coupled to the base frame to facilitate removal and replacement of the first shelving component. A second shelving component can used to reconfigure the shelf assembly to support objects according to a second configuration. The shelf assembly can include a pair of electrically conductive support arms extending from the base frame to selectively mount the base frame to a wall assembly. The wall assembly can provide electrical power to the electrically conductive arms. The circuitry can include a light source and a pair of conductive mounting members. The conductive mounting members can selectively engage the electrically conductive arms to energize the light source.

25 Claims, 20 Drawing Sheets

(56) References Cited

U.S. PATENT DOCUMENTS

| | | | |
|---|---|---|---|
| 3,894,170 A | 7/1975 | Harmut | |
| 4,401,222 A | 8/1983 | Kulikowski et al. | |
| 4,973,796 A | 11/1990 | Dougherty et al. | |
| 5,348,485 A | 9/1994 | Briechle et al. | |
| 5,477,971 A | 12/1995 | Howard | |
| 5,509,541 A | 4/1996 | Merl | |
| 5,641,081 A | 6/1997 | Merl | |
| 5,695,261 A | 12/1997 | Slesinger et al. | |
| 6,092,672 A * | 7/2000 | Harris | B42F 7/10 211/11 |
| 6,129,218 A * | 10/2000 | Henry | A47F 5/005 211/59.3 |
| 6,199,705 B1 | 3/2001 | Portner | |
| 6,527,406 B1 | 3/2003 | Slesinger et al. | |
| 6,527,565 B1 | 3/2003 | Johns | |
| 6,942,108 B2 * | 9/2005 | Wons | A47F 7/145 211/128.1 |
| 7,946,435 B2 | 5/2011 | Clark et al. | |
| 7,954,979 B2 | 6/2011 | Sommers et al. | |
| 8,157,109 B2 * | 4/2012 | Zu | A47B 43/003 211/55 |
| 8,733,563 B2 * | 5/2014 | Fadrowski | A47F 5/0025 211/144 |
| 8,967,740 B2 | 3/2015 | Kerner | |
| 9,157,678 B2 | 10/2015 | Kerner | |
| 2004/0055514 A1 | 3/2004 | De Land et al. | |
| 2005/0082082 A1 | 4/2005 | Walter et al. | |
| 2006/0207778 A1 | 9/2006 | Walter | |
| 2006/0209537 A1 | 9/2006 | Stelmasik et al. | |
| 2008/0314852 A1 * | 12/2008 | Richter | A47F 1/12 211/184 |
| 2011/0017763 A1 * | 1/2011 | Colelli | A47F 1/125 221/1 |
| 2011/0278245 A1 * | 11/2011 | Noble Colin | A47F 5/12 211/59.2 |
| 2011/0315645 A1 * | 12/2011 | Fadrowski | A47F 5/02 211/59.2 |
| 2012/0085718 A1 | 4/2012 | Bergdoll et al. | |
| 2012/0230018 A1 | 9/2012 | Wiemer et al. | |
| 2013/0094202 A1 | 4/2013 | Wylie | |
| 2014/0104826 A1 | 4/2014 | Bergdoll et al. | |
| 2014/0238991 A1 * | 8/2014 | Morrell | B66B 5/0087 220/482 |
| 2014/0305891 A1 * | 10/2014 | Vogler | A47F 1/125 211/59.3 |
| 2014/0349502 A1 | 11/2014 | Meis | |
| 2015/0157142 A1 * | 6/2015 | Turner | A47F 1/125 211/59.3 |
| 2015/0173529 A1 | 6/2015 | Hester-Redmond | |

* cited by examiner

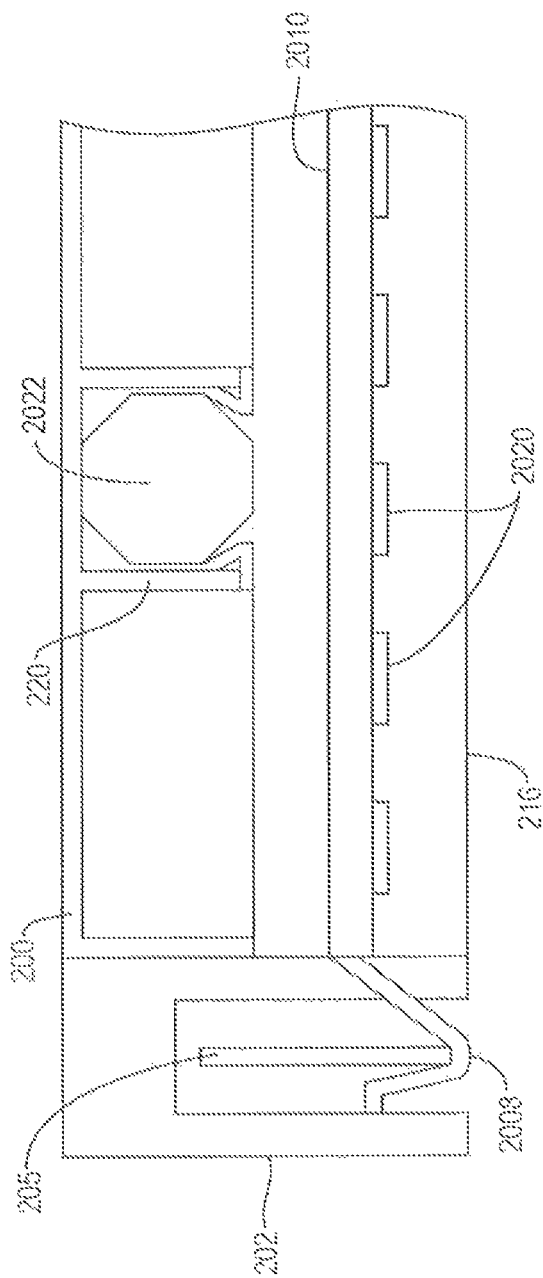

MODULAR SHELF ASSEMBLY FOR A COSMETIC FIXTURE SYSTEM

CROSS-REFERENCE TO RELATED APPLICATIONS

This application claims priority to and benefit of U.S. Provisional Patent Application No. 61/920,426, filed Dec. 23, 2013, the disclosure of which is incorporated herein by reference in its entirety. This application also claims priority to and benefit of U.S. Provisional Patent Application No. 61/920,388, filed Dec. 23, 2013, the disclosure of which is incorporated herein by reference in its entirety.

FIELD OF INVENTION

Exemplary embodiments of the present disclosure generally relate to modular and reconfigurable shelf assemblies that can be configured to hold and/or display merchandise in a retail environment.

BACKGROUND

Shelf assemblies are often constructed to accommodate a fixed arrangement of products. Changing a product display or accommodating a new product can be cumbersome and difficult. As an example, some conventional product displays designed for displaying cosmetics require an intensive effort to reset and reconfigure the display to include new or alternate products. As another example, some conventional displays for displaying cosmetics cannot accommodate a change in the lighting configurations required by the new display arrangement.

Having shelf assemblies that are constructed to accommodate fixed arrangements of products can require retail entities to maintain an inventory of different shelving solutions. The general inflexibility of conventional shelving systems can lead to an inefficient installation process as well as an inability to accommodate new product dimensions or products with the retail entity's existing inventory of shelving solutions.

SUMMARY

Exemplary embodiments of the present disclosure are related to modular and reconfigurable shelf assemblies that can be configured to hold or display merchandise in a retail environment. The shelf assemblies can have a reconfigurable construction to facilitate changing the shelf assemblies to adapt to the display requirements, product requirements, to adapt to a combination of display and product requirements. For example, the reconfigurable shelving assemblies can have modular components that can be assembled to accommodate different product dimensions and/or product packaging to overcome the limitation and/or disadvantages of conventional shelving assemblies and can provide retail/wholesale entities with a flexibility to reconfigure the shelving assemblies to meet their needs.

In an exemplary embodiment the shelf assembly can include a base frame and a first shelving component. The first shelving component can be configured to support objects according to a first configuration. The shelf assembly can include a second shelving component to reconfigure the shelf assembly to support an object according to a second configuration. The first shelving component can be detachably coupled to the base frame to facilitate removal and replacement of the first shelving component with a second shelving component.

In some embodiments, the base frame can have a pair of electrically conductive support arms. A wall assembly can be configured to receive the selectively mountable pair of electrically conductive support arms. The wall assembly can be configured to provide electrical power to the electrical conductive support arms. The conductive mounting members can selectively engage the electrically conductive arms to energize the light source.

The base frame can include a plurality of walls that define a perimeter of the base frame and can include a first mating area configured to interact with a second mating area of the first or second shelving components. For example, a rail extending proximate to a rear side of the base frame, a slot in the front side for retaining the first or second shelving component and a resilient detent member on the rear side for retaining the first or second shelving component. The first or second shelving components can have an object holding area configured to hold the object relative to the base frame.

In some embodiments, the shelf assembly can include a brush holding portion. The base frame can include a channel proximate to the front of the base frame, the brush holding portion can include an edge forming the second mating area and face configured to hold a brush relative to the base frame. The channel can be configured to receive the edge of the detachably coupled brush holding portion to the base frame.

In some embodiments, the shelf assembly can include an elongated peg hook. A bracket can be disposed at the rear end of the peg hook. The base frame can include a rail proximate to the rear of the base frame, configured to detachably couple to the bracket.

In some embodiments, the shelf assembly can include a divider tray that can have a plurality of settings for modular reconfiguration. The divider tray can be detachably coupled to the base frame. The divider tray can have a front retaining wall extending upwardly from the front edge of the divider tray and a rear retaining wall extending upwardly from the rear edge of the divider tray. A divider can extend from the front retaining wall to the rear retaining wall of the divider tray. The position of the divider can be selectively fixed to the front retaining wall with a first alignment slot disposed at the front retaining wall. The position of the divider can be selectively fixed to the rear retaining wall with a second alignment slot disposed at the rear retaining wall.

In some embodiments, the divider tray can include a pusher assembly having a pusher track, a coil spring, and a pusher panel. The pusher assembly can be detachably coupled to the front edge and the rear edge of the divider tray. The pusher assembly includes a tab or projection that engages a first alignment slot disposed at the front retaining wall and a second alignment slot disposed at the rear retaining wall. The first and the second alignment slot can be configured to selectively fix the position of the pusher assembly.

In some embodiments, the shelf assembly can include a tray that can be detachably coupled to the base frame. The tray can have a bottom surface that extends downwardly beyond the bottom of the base frame. The bottom surface can include a front wall, a rear wall and a plurality of side walls that extend upwardly. The front wall can include a first mating area configured to detachably couple to a corresponding first mating area disposed proximate to a front edge of the base frame. The rear wall can include a second mating area disposed proximate to a rear edge of the base frame. A divider can extend from the front edge of the base frame to the rear edge of the base frame to divide the tray into object holding areas.

In some embodiments, the shelf assembly can include a trim tray that can have various setting for modular reconfiguration. The trim tray can be detachably coupled to the base frame. The trim tray can include a first surface extending in the horizontal plane from the front of the base frame toward the rear of the base frame, a second surface extending in a vertical plane from the first surface and dividers extending upwardly in the vertical plane from the first surface. The first surface can have a first mating area configured to detachably couple to a corresponding first mating area of the base frame disposed proximate to the front of the base frame. The second surface can have a second mating area configured to detachably couple to a corresponding second mating area of the base frame disposed proximate to the rear of the base frame. The first and the second surfaces can be configured with alignment slots to receive the trim tray dividers. The trim tray dividers can form horizontally and/or vertically offset object holding areas.

In some embodiments, the shelf assembly can include a lifter tray disposed between the divider tray and the base frame. In some embodiments, the shelf assembly can include a divider tray with a slide roll tray. The slide roll tray can have a first and a second vertical member extending upwardly from opposing side walls of the base frame. A plurality of ledges can extend from the first and the second vertical members positioned within the perimeter of the base frame. The front and rear portion of the ledges can be aligned with a vertical offset.

In some embodiments, the shelf assembly can include a divider tray configured to a cubby bin. The divider tray and cubby bin combination can be detachably coupled to the base frame. In some embodiments, the base frame can include a release tab to disengage the divider tray from the base frame.

In another aspect, some embodiments are directed towards a shelf assembly including a wall assembly, a base frame, shelving arms and object support structures. The object support structures can include an object holding area and a mating area. The mating area can be configured to mate with the corresponding mating area of the base frame to interchangeably couple the object support structures to the base frame. The object holding areas can be configured to hold objects relative to the base frame.

In some embodiments, the object support structure can be configured with a channel proximate to the front of the base frame and the shelf assembly and can be configured with a brush shroud. The channel can be configured to receive an edge of the detachable brush shroud and couple the brush shroud to the base frame.

In some embodiments, the shelf assembly can include an elongated peg hook and the base frame can include a rail proximate to a rear of the base frame a bracket can be disposed at the rear end of the peg hook and can include a post extending from the bracket. The bracket can be detachably coupled to the rail proximate to the rear of the base frame.

In some embodiments, the shelf assembly can include an object support structure having a plurality of setting for modular reconfiguration. The object support structure can be detachably coupled to the base frame. In some embodiments, the shelf assembly can include an object support structure having a front retaining wall extending upwards from the front edge of the object support structure and a rear retaining wall extending upwards from the rear edge of the object support structure. A divider can extend from the front retaining wall of the object support structure to the rear of the object support structure. In some embodiments, the shelf assembly can include a lifter tray detachably disposed between the object support structure and the base frame.

In some embodiments, the shelf assembly can include a slide roll tray. The slide roll tray can include a first and a second vertical member arranged parallel to each other and extending upwardly from a side wall. A plurality of ledges can extend from the first and the second vertical member, within the perimeter of the base frame. The ledges can be configured with the rear portion of the ledge positioned vertically higher than the front portion of the ledge.

In another aspect, embodiments are directed to a method of configuring a shelf assembly. The method includes selecting an object support structure from a set of object support structures configured to be interchangeably coupled to the base frame. The object support structure can have an object holding area and an object mating area. The mating area of the object support structure can be aligned with the mating area of a corresponding base frame. The object support structure can be detachably coupled to the base frame by engaging the corresponding mating areas to form the shelf assembly wherein the object holding area has a configuration for holding objects relative to the base frame. The object support structure can be detached from the base frame. A different object support structure can be selected and can be detachably coupled to the base frame to reconfigure the shelf assembly.

Any combination or permutation of embodiments is envisioned. Other objects and features will become apparent from the following detailed description considered in conjunction with the accompanying drawings, wherein like reference numerals identify like elements. It is to be understood, however, that the drawings are designed as an illustration only and not as a definition of the limits of the present disclosure.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component can be labeled in every drawing. In the drawings:

FIG. 7B depicts a cross sectional view of an exemplary light source interfacing with a base frame that can be used to form the shelf assemblies.

DETAILED DESCRIPTION OF EXEMPLARY EMBODIMENTS

Exemplary embodiments of the present disclosure are directed to reconfigurable shelf assemblies for displaying products in a retail environment. Exemplary embodiments of the reconfigurable shelf assemblies can be configured using modular components to advantageously provide one or more shelf assemblies that can be configured to hold and display different sized and shaped products. The configurability of the shelf assemblies can provide retailers with flexibility when designing and/or installing a merchandise display wall in a retail environment so that the retailers do not have to maintain an inventory of different shelving fixtures having fixed configurations.

In exemplary embodiments, the reconfigurable shelf assemblies can include a universal base frame that can be used to form one or more of the shelf assemblies such that shelving components (e.g., object support structures) can be added to or removed from the universal base frame to create different shelving configurations to accommodate different merchandise display needs. In some embodiments, the shelving components in conjunction with the universal base frame can be configured to hold one or more cosmetic products.

Figure 1A:
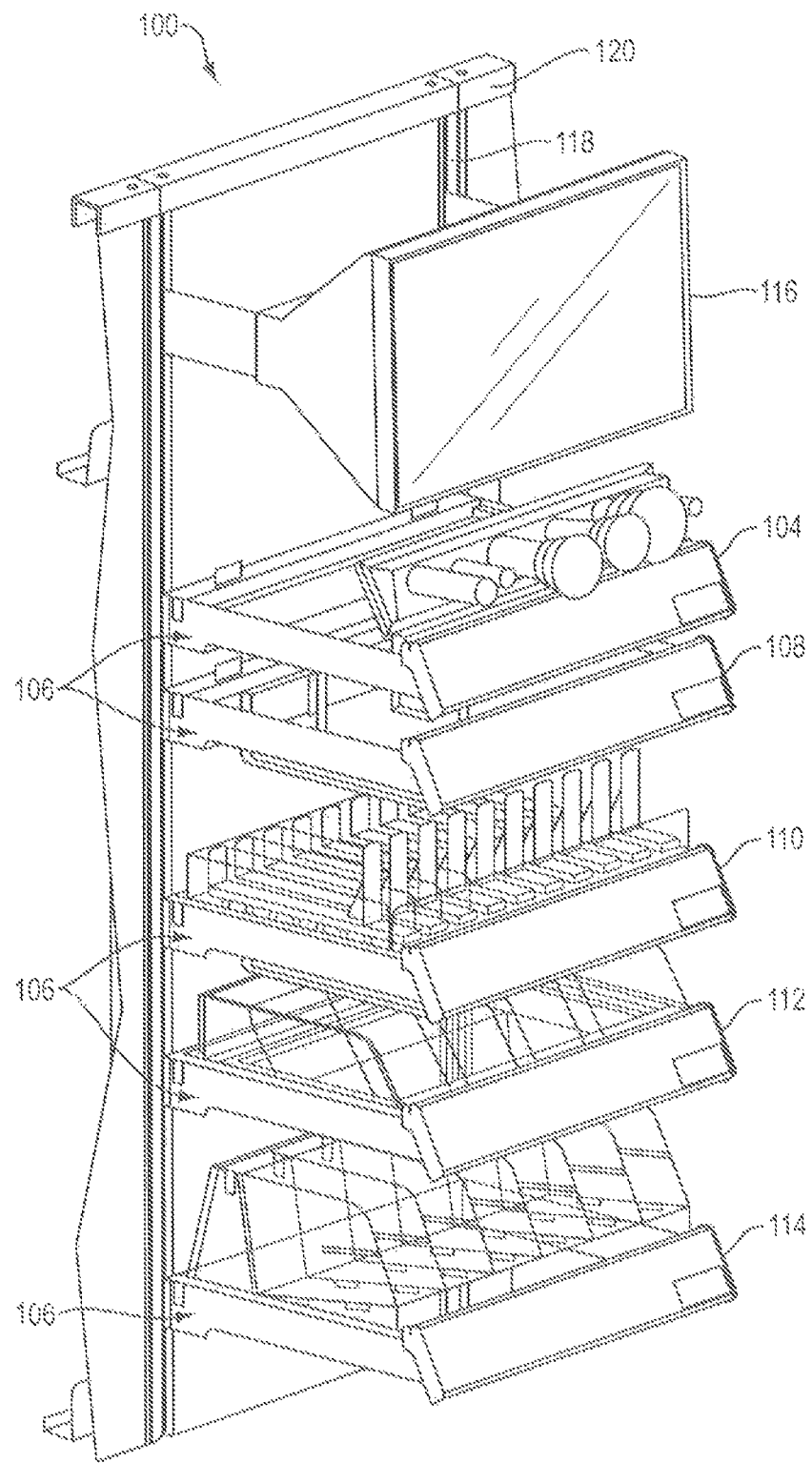
FIG. 1A depicts a front perspective view of a merchandise display wall structure having exemplary configurations of reconfigurable shelf assemblies mounted thereto in accordance with exemplar embodiments of the present disclosure.
Figure 1B:
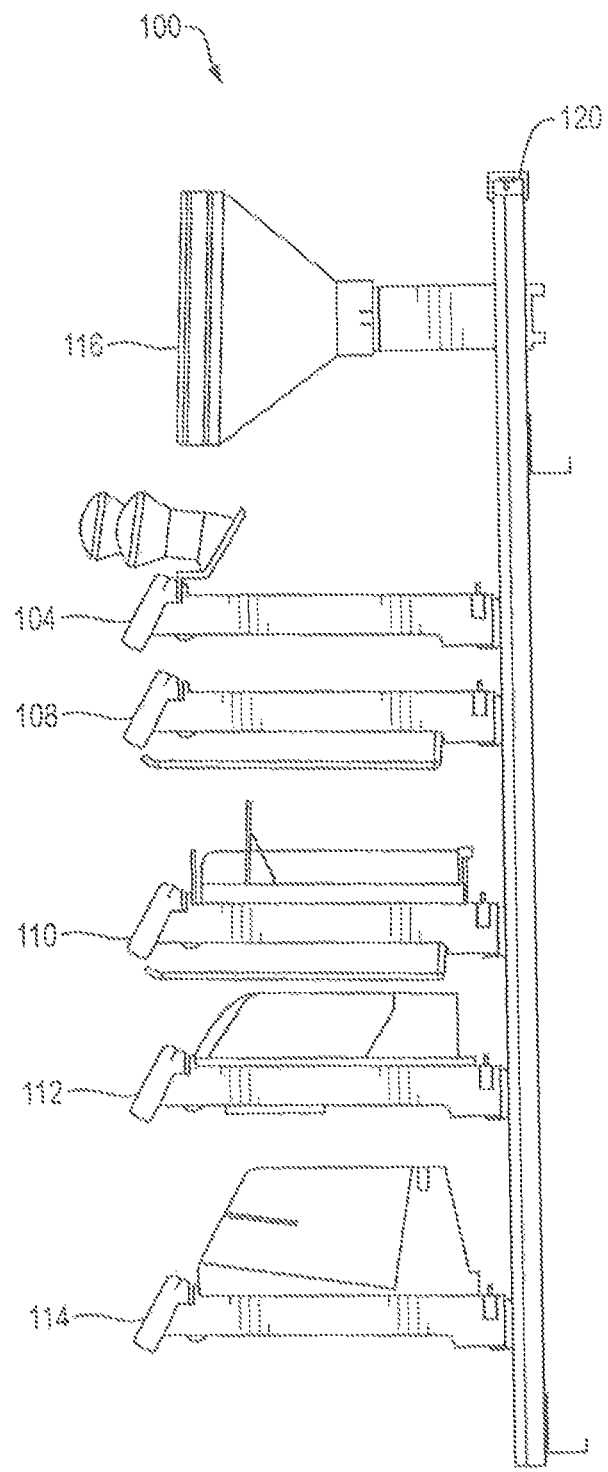
FIG. 1B depicts a side view of the merchandise display wall structure of FIG. 1.
Figure 24:
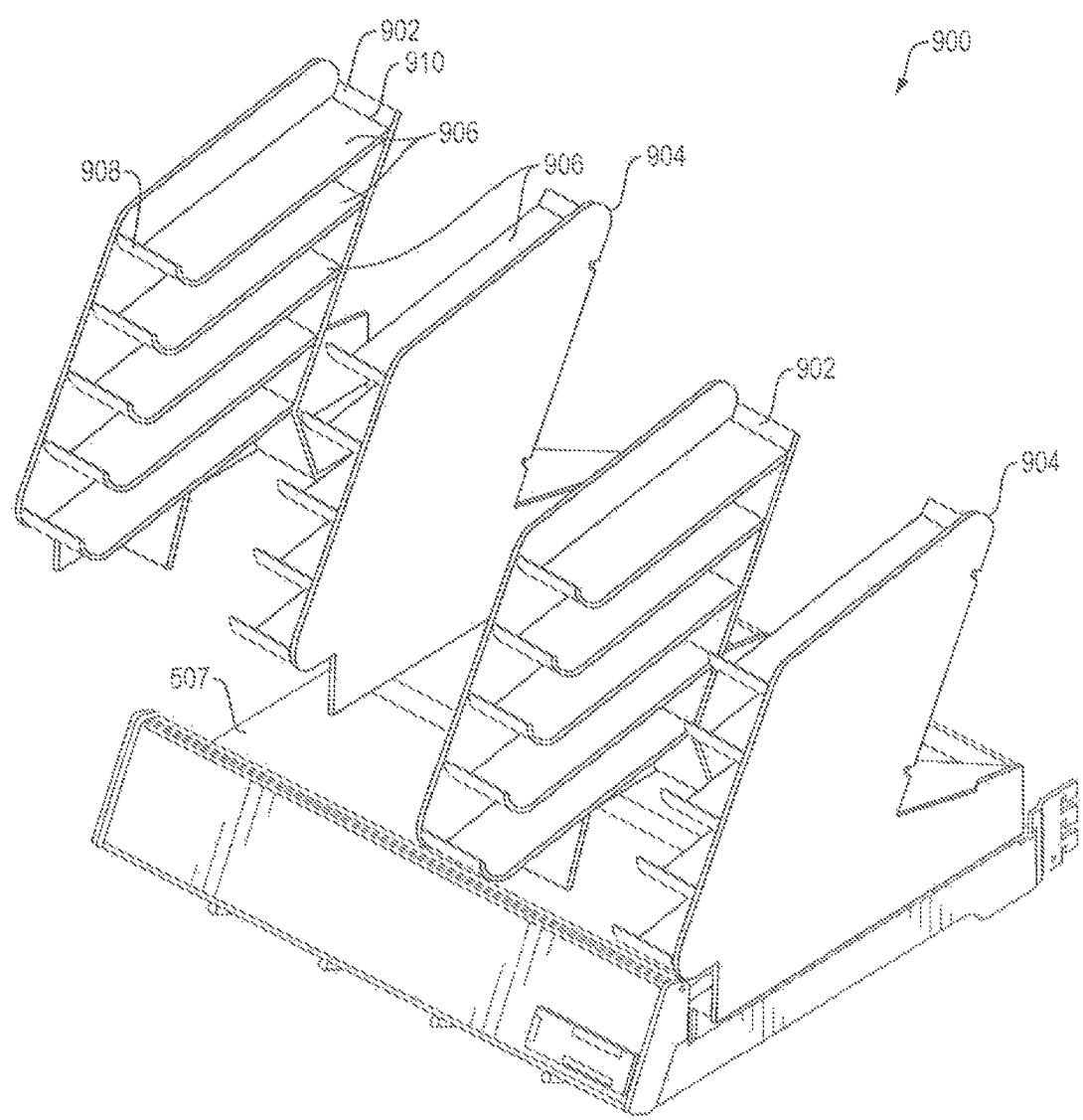
FIG. 24 depicts a front perspective view of an exemplary embodiment of a reconfigurable shelf assembly configured as an assembled slide roll tray shelf assembly.

FIGS. 1A and 1B depict exemplary embodiments of reconfigurable shelf assemblies 106 secured to a wall assembly 120 to form a merchandize display wall system 100. Exemplary embodiments of the wall assembly are described in more detail in U.S. patent application Ser. No. 61/920,388 entitled "Modular Wall Assembly For A Cosmetic Fixture System" filed concurrently herewith, which is incorporated herein by reference in its entirety and for all purposes. Each of the shelf assemblies 106 can be configured to hold and/or display retail products in a retail environment. In some embodiments, the wall system 100 includes various configurations of the shelf assemblies 106 including a universal base frame 105 and various shelving components 107 (e.g., object support structures) to form a brush display shelf assembly 104, a peg hook shelf assembly 108, a divider tray shelf assembly 110, a bon bon tray shelf assembly 112, and a trim tray shelf assembly 114. In exemplary embodiments, one or more of the reconfigurable shelf assemblies 106 can be mounted to the wall assembly 120 in one or more configurations to form the merchandise display wall system 100. For example, one or more of the shelf assemblies 104, 108, 110, 112, and/or 114 can be mounted to the wall assembly 120. While an exemplary embodiment of the merchandise display wall has been depicted to include the shelf assemblies 104, 108, 110, 112, and 114, those skilled in the art will recognize that other configurations of the shelf assemblies can be mounted to the merchandise display wall system 100. For example, FIG. 24 depicts an exemplary slide roll tray shelf assembly that can be mounted to the merchandise display wall system. In exemplary embodiments, the merchandise display wall system 100 can include all shelves of the same type or any combination of the shelf assemblies 106.

The shelf assemblies 106 can be selectively coupled to electrically conductive vertical uprights 118 of the wall assembly 120. For example, the shelf assemblies 106 can include a pair of electrically conductive support arms extending from the shelf assemblies 106, as described in more detail below, to attach the shelf assemblies 106 to the wall assembly 120. The wall assembly 120 can be configured to provide electricity to the shelf assemblies 106 via the vertical uprights 118 to power circuitry associated with the shelf assemblies 106. For example, the shelf assemblies 106 can include circuitry including a light source, which can illuminate one or more areas around the shelf assemblies 106. When the electrically conductive arms engage the wall assembly 120, electricity flows from the vertical uprights 118 through the electrically conductive arms and to the circuitry to energize the light source.

In the some embodiments, an informational display member 212 can be detachably coupled to a front of the shelf assemblies 106. The informational display member 212 can receive display materials including display materials corresponding to product information, price information, store information, and/or any suitable information related to the one or more products to be supported and/or displayed by the shelf assemblies 106.

In exemplary embodiments, the wall system 100 can have a reconfigurable arrangement allowing for one or more of the shelf assemblies 106 to be reset, removed or rearranged, either as a group or independent of one another. Reconfiguration can be used to adapt to new product displays or to adapt to retail facility resets.

In some embodiments the shelf assemblies 106 can be adjustably spaced along the wall assembly 120. For example, the shelf assemblies 106 can be attached to the wall system 100 with uniform spacing between the shelf assemblies 106 and/or can be attached to the wall system 100 with different or variable spacing between the shelf assemblies 106.

In some embodiments, the wall system 100 can include one or more light boxes 116. The one or more light boxes 116 can be placed towards a top of the wall system 100 or between one or more of the shelf assemblies 106. The one or more light boxes 116 may have a fixed light characteristic or may have variable characteristics, which may depend on a location at which the wall system 100 is disposed in the facility (e.g., a retail store), a time of day, and/or the particular products contained/supported by the shelf assemblies 106 of the merchandise display wall system 100. In some embodiments, the light box 116 may be configured to produce varying colors or intensities of light.

Figure 2:
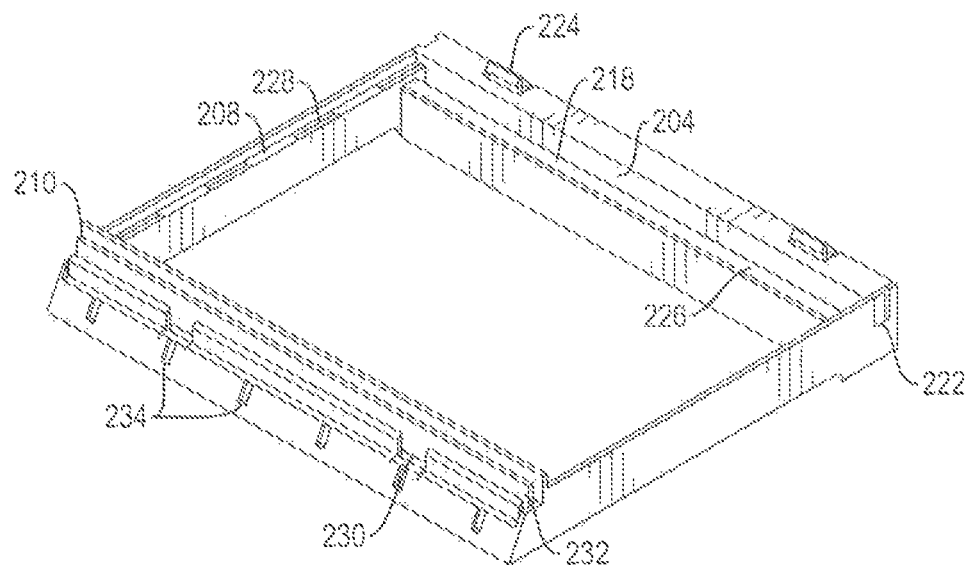
FIG. 2 depicts a universal base frame that can be used to form the shelf assemblies.
Figure 3:
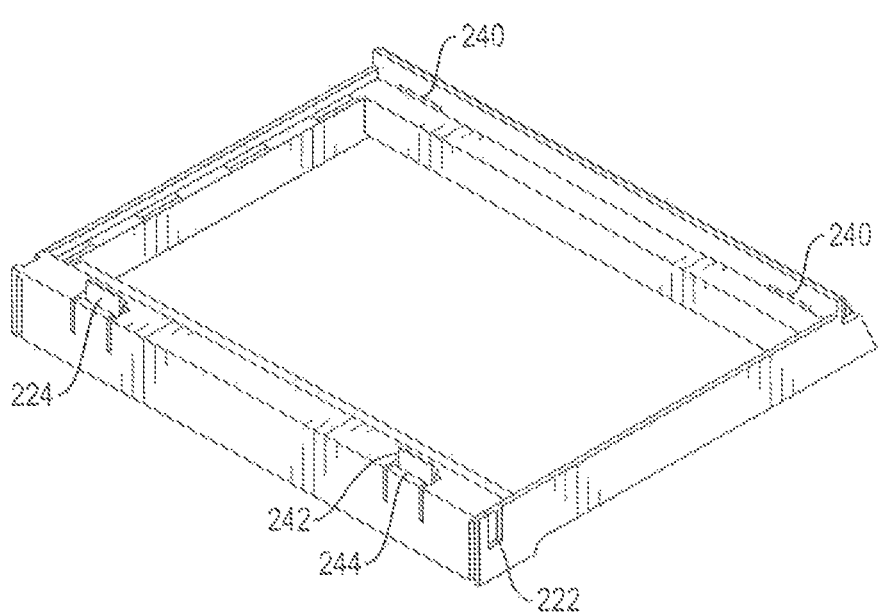
FIG. 3, depicts a front perspective view of an exemplary universal base frame that can be used to form the shelf assemblies.
Figure 4:
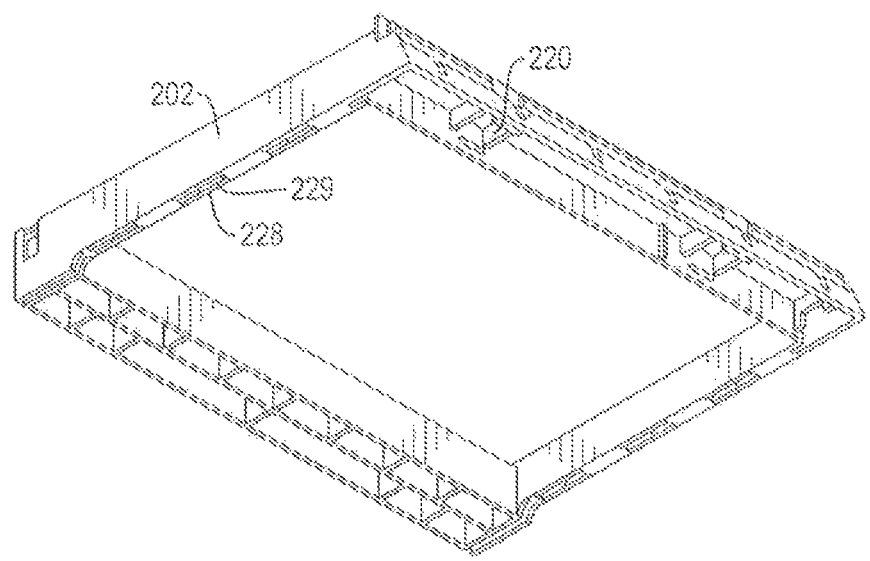
FIG. 4, depicts a bottom perspective view of an exemplary universal base frame that can be used to form the shelf assemblies.

FIG. 2 depicts a front perspective view of a universal base frame 200 that can be used to form the shelf assemblies 106. FIG. 3 depicts a rear perspective view of the universal base frame 200. FIG. 4 shows a bottom perspective view of the base frame 200. As shown in FIGS. 2-4, the base frame 200 includes first and second side walls 202 extending between a rear wall 204 and a front wall 210. In some embodiments, the side walls 202 can be opposingly spaced and can extend parallel to each other. Likewise, the rear wall 204 and the front wall 210 can be opposingly spaced and can extend parallel to each other. The side walls 202 can generally extend perpendicularly from the rear wall 204 and the front wall 210 such that the base frame 200 has a rectangular or square shaped configuration. The side walls 202, rear wall 204, and front wall 210 can define a perimeter of the base frame 200. As shown in FIG. 3, the rear wall 204 can include openings 225 for receiving electrically conductive arms as described herein.

Referring to FIGS. 2-4, the base frame 200 can include one or more mating members 223 distributed in different areas, for example around a perimeter (e.g., mating areas) of the base frame 200 to facilitate selective attachment of one or more shelving components to the base frame 200 to form an assembled shelf. For example, the mating members 223 of the base frame 200 can be configured to support the shelving components to facilitate different configurations of the shelf assemblies 106, such as the brush display shelf 104, the peg hook shelf 108, the divider tray shelf 110, the bon bon tray shelf 112, the trim tray shelf 114, and/or the roll slide tray shelf described herein.

Examples of the mating members 223, can include a rear rail 218, resilient detent members 224, channels 230 and 232, and openings, such as slots 228 and 240. The rear rail 218 can be disposed along an inner surface of the rear wall 204 and can be configured to receive corresponding mating members of the shelving components and/or can generally provide support to the shelving components. The resilient detent members 224 can be formed in the rear wall 204 such that at least a portion of the resilient detent members 224 are recessed in the rear wall 204 and at least a portion of the resilient detent members 224 protrude and/or extend upwards from the rear wall 204. The resilient detent members 224 can be configured to selectively retain one or more shelving components to the base frame 200. For example, the resilient detent members 224 can form release tabs to disengage shelving components coupled to the base frame 200. The members 224 can be used to disengage shelving components corresponding to one shelf assembly from the base frame 200 to allow another shelf assembly to be configured using the base frame 200.

The channels 230 and 232 can be formed in a raised structure extending along an upper surface of the front wall 210. For example, the channels 230 and 232 can be formed to extend outwardly in a direction opposite to a floor on which the system stands from an outer portion of the upper surface of the front wall 210 such that the channels protrude from the front wall 210. In exemplary embodiments, the channels 230 and 232 can be adjacently spaced, can extend parallel to one another along a length of the front wall 210 and can be vertically offset from one another such that the channels 230 and 232 have a tiered configuration. The channel 230 can be positioned forward of the channel 232 and can be disposed along the front wall 210 to be lower than the channel 232.

In some embodiments, the front wall 210 may be configured to receive a light source. For example, an underside of the front wall 210 can be configured with snaps 220 to detachably couple the light source to the front wall 210. The light source may be disposed along the underside outer surface of the base frame front wall 210. Alternatively, the light source may be disposed along the underside of the rear wall 204 or along the underside of the base frame side support frame 208. The light source may be configurable to include adjustable light settings including variations in light color or light intensity.

The slots 228 and 240 can be formed at various locations on the base frame 200 and can be configured to receive corresponding mating members of shelving components. As depicted in FIGS. 2-4, the slots 228 can be disposed in an upper surface and/or lower surface of the side walls 202. In some embodiments, the side walls 202 can include four slots 228 disposed in the upper surface of each of the side walls 202. The slots 228 can be uniformly distributed along a length of the side walls 202 and can be disposed inwardly of lips 229 extending along the length of side walls 202, which can protrude upwardly relative to an outer portion of the upper surface of the side walls 202 and can facilitate alignment and/or seating of one or more shelving components with respect to the base frame 200. The slots 228 and 240 can be configured to receive corresponding mating members of one or more shelving components.

The slots 240 can be formed in the raised structure protruding from the front wall 210 and can be disposed proximate to an intersection between the upper surface of the front wall 210 and the raised structure. In the some embodiments, two slots 240 can be formed in the raised structure and can be spaced apart from one another such that the each of the slots 240 are positioned closer to one of the side walls 202 than to each other. The slots 240 can be configured to receive corresponding mating members of one or more shelving components, and in some embodiments, can operate in conjunction with the detent members 224 to selectively retain the one or more shelving components.

Figure 5:
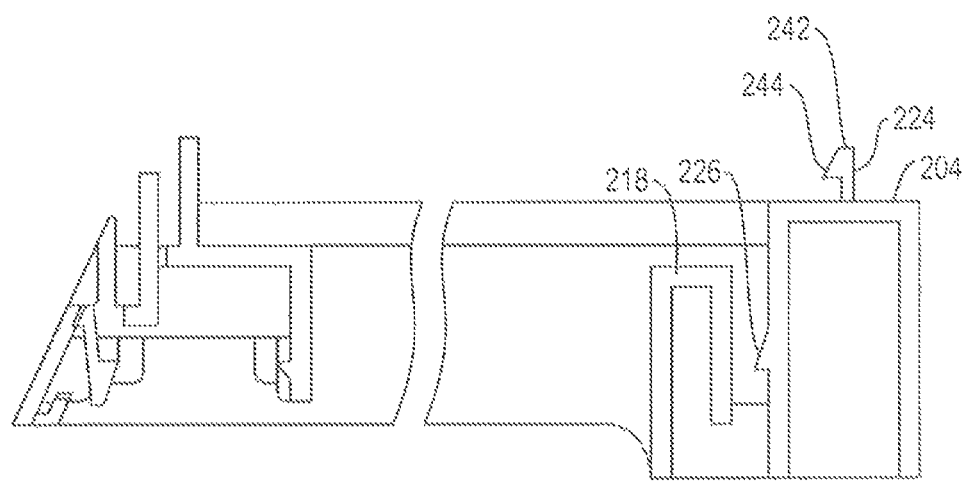
FIG. 5 depicts a side cross sectional view of an exemplary universal base frame that can be used to form the shelf assemblies.

FIG. 5 depicts a cross-sectional side view of an exemplary embodiment of the base frame 200. As depicted in FIG. 5, a lower portion of the rear rail 218 can be integrally formed with the rear wall 204 and an upper portion of the rear rail 218 can be spaced away from the rear wall 204 such that a channel is formed between the rear wall 204 and the rear rail 218. An inner surface of the rear wall 204 can include ribs 226 projecting outwardly from the rear wall 204 and towards the rear rail 218 to aid in receiving and aligning shelving components configured to mate with the rear rail 218.

Still referring to FIG. 5, the resilient detent members 224 formed in the rear wall 204 can extend upwardly from the rear wall 204. The resilient detent members 224 can include an elongate projection portion 242 that extends upwardly from the rear wall 202 and a lip portion 244 extending from the projection portion 242 to form a free end of the resilient detent members 224. In an exemplary operation, the resilient detent members 224 can be displaced rewardly from their normal position as corresponding mating members of a shelving component engage the resilient detent members 224. After the corresponding mating members are fully received within a recess associated with the resilient detent member 224 the detent members 224 can return to their normal position such that the lip portion 244 can form a latch to selectively retain the shelving component on the base frame 200.

Figure 6A:
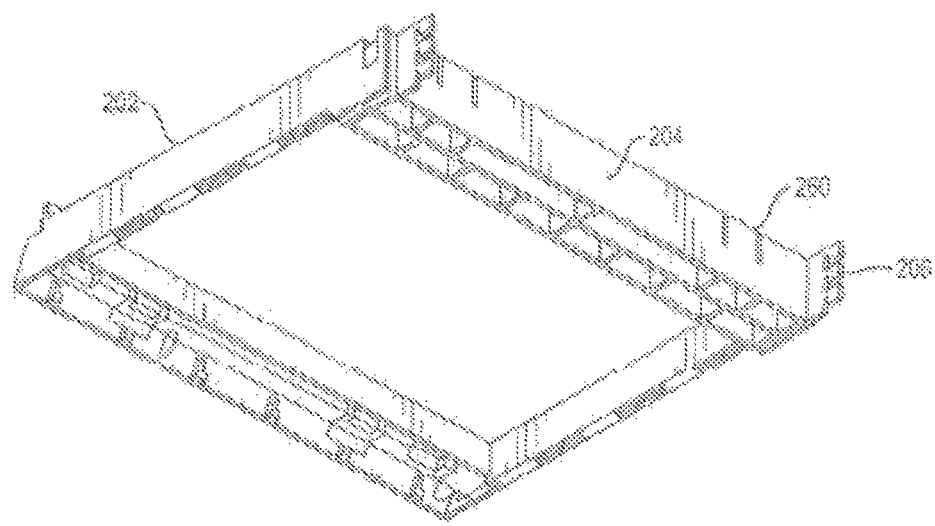
FIG. 6A depicts a rear perspective view of an exemplary universal base frame that can be used to form the shelf assemblies.

FIG. 6A depicts a rear perspective view of a universal base frame that can be used to form any of the shelf assemblies 106. As shown in FIG. 6A, the electrically conductive arms 205 can be disposed within the side walls 202. A rear terminal end 207 of the electrically conductive arms can extend beyond the rear wall 204 of the base frame 200 and can include toothed fastening members 206 having generally serrated edges. The toothed fastening members 206 can be used to selectively attach the base frame 200 to the vertical uprights 118 of the wall system 100. In exemplary embodiments, the electrically conductive arms 205 can be formed of a metallic material.

Figure 6B:
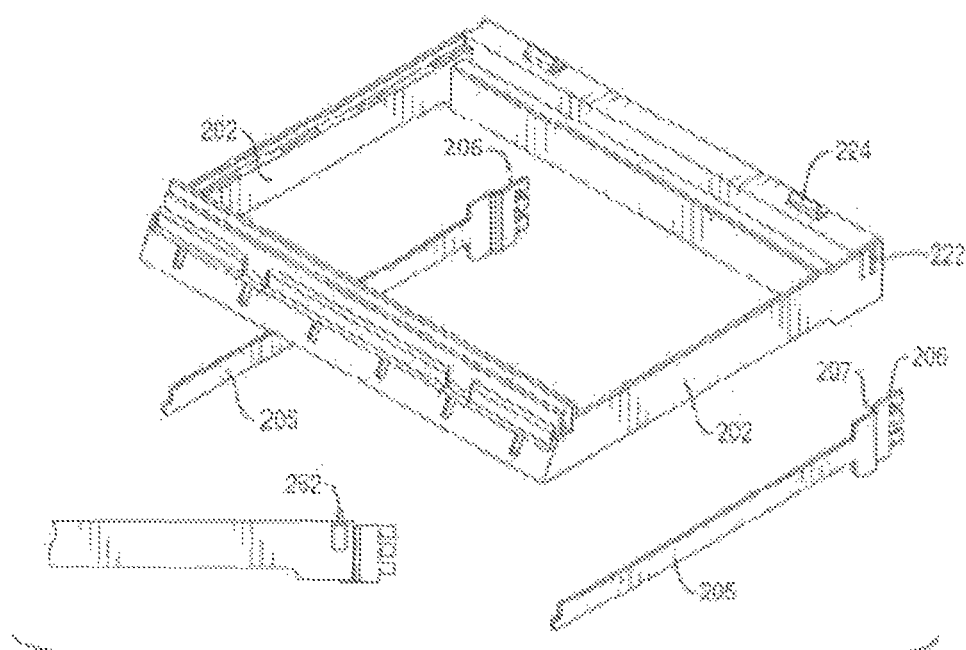
FIG. 6B depicts a front perspective view of an exemplary universal base frame that can be used to form the shelf assemblies.

FIG. 6B, depicts a front perspective view of a universal base frame that can be used to form any of the shelf assemblies 106. In some embodiments, the electrically conductive arms 205 can be removeably disposed within the side walls 202 of the base frame 200. For example, the electrically conductive arms 205 can slide into and out of the side walls 202 through openings 225 disposed proximate to the terminal ends of the rear wall 204. When the electrically conductive arms 205 are received within the side walls 202, the electrically conductive arms 205 can be selectively retained by the side walls 202. For example, to retain the electrically conductive arms 205 in the side walls 202, exemplary embodiments of the electrically conductive arms 205 can include locking barbs 222 projecting from at least one of the longitudinally extending edges of the electrically conductive arms 205. The locking barbs 222 can catch one or more corresponding structures on the side walls 202, such as one or more openings disposed along a bottom surface of the side walls 202.

Figure 7A:
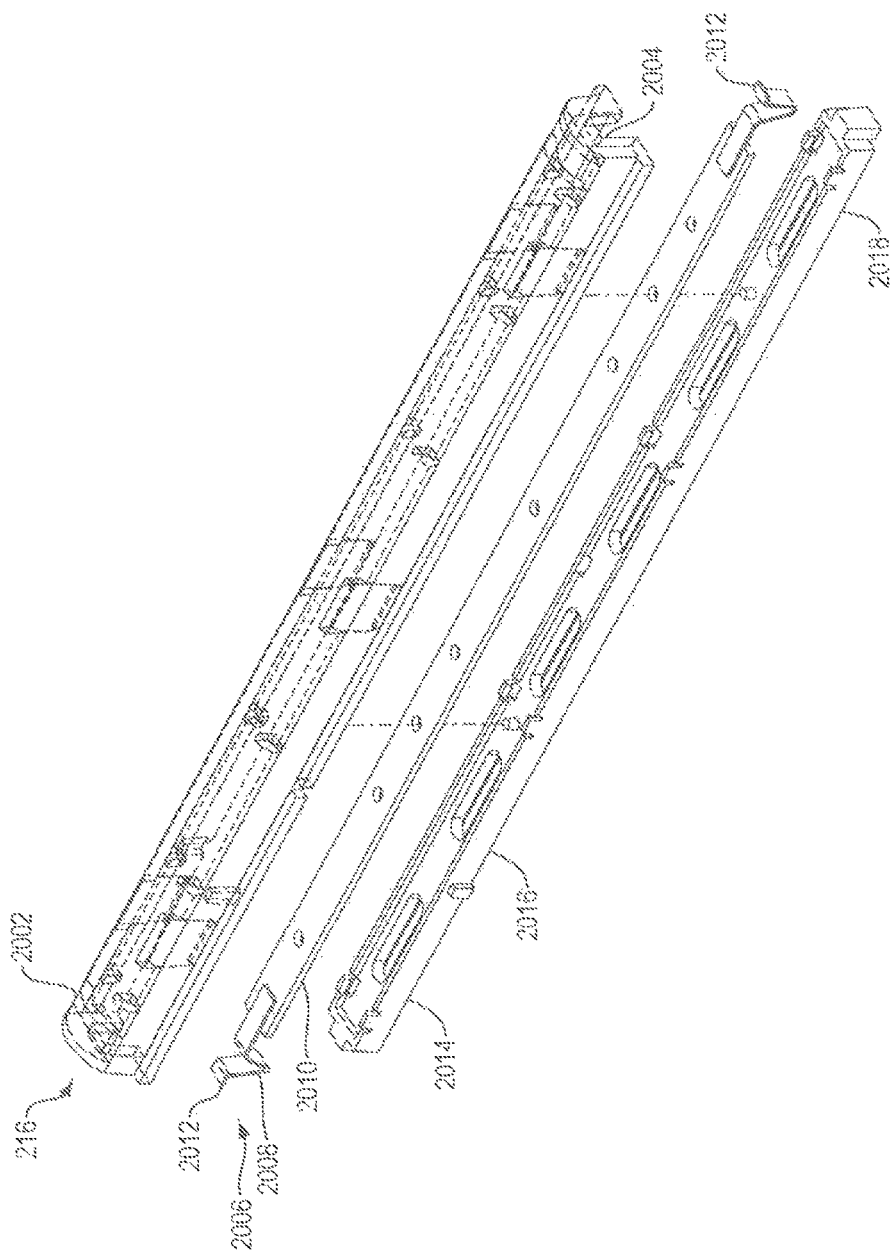
FIG. 7A depicts an assembly perspective view of an exemplary light source that can be used to form the shelf assemblies.

FIG. 7A depicts an assembly perspective view of a light source module 216 that can be removeably coupled to embodiments of the base frame 200 when configuring the shelf assemblies 106. As shown in FIG. 7A, the light source module 216 can include a circuit board having electronic circuitry 2010, a frame 214, and a cover 2002. The circuit board 2006 can be removeably disposed within the frame 2014. For example, the board 2006 can be coupled to a mating member 2008 of the frame 2014 and can snap into the frame 2014 via a resilient detent member 2018 configured to receive the circuit board 2006. The cover 2002 can be configured to receive a mating tab 2012 to couple the circuit board 2006 and the frame 2014 within the cover 2002. In exemplary embodiments, the light source module 216 may be disposed and selectively coupled to the base frame 200 along the underside outer surface of the front wall 210 of the base 200.

FIG. 7B depicts a cross sectional view of a portion of an exemplary embodiment of the light source module 216 and the base frame 200. As depicted in FIG. 7B, the light source module 216 can be selectively coupled to the base frame 200 with molded snaps 220 configured to receive the molded snap mating members 2022 of the light source 216. The side wall 202 of the base frame 200 can include electrically conductive arms 205 that can be configured to the conductive mounting members 2008 extending from the circuit board 2010 of the light source 216.

Figure 8:
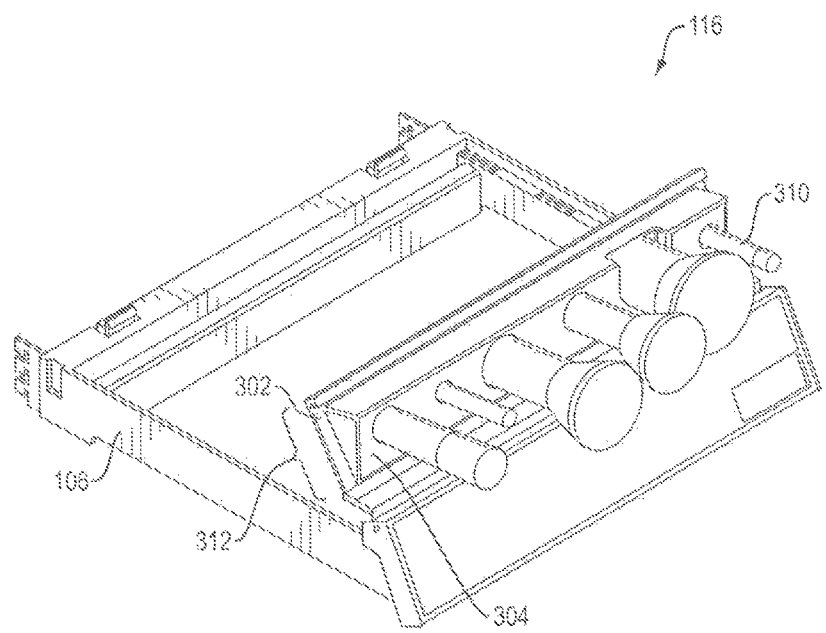
FIG. 8 depicts a front perspective view of an exemplary brush display that can be used with the configurable shelf assemblies to form the brush display shelf assembly.

FIG. 8 depicts a front perspective view of a brush display portion 312 (e.g., shelving components or object support structures) that can be used with the configurable shelf assemblies 106 to form the brush display shelf assembly 104. As shown in FIG. 8, the brush display shelf assembly 104 can include the universal base frame 200 and the brush display portion 312. In exemplary embodiments, the brush display portion 312 can include a brush holder 302 and a brush shroud 304. The brush holder 302 and brush shroud 304 can be formed using any suitable materials including, for example, plastic, metal, acrylic, fiberglass, and the like. The brush holder 302 can be coupled to the brush shroud 304 to form the brush display portion 312 of the shelf assembly 104. The brush holder 302 can be configured with a downwardly depending support structure 308 configured perpendicular to the underside of the brush holder 302 so that the downwardly depending support structure extends towards a floor when the underside of the brush holder 302 is positioned generally parallel to the floor. The downwardly depending support structure 302 has a terminal end 306 that forms a mating member of the brush holder 302 to selectively couple the brush display portion 312 to the base frame 200.

Figure 9:
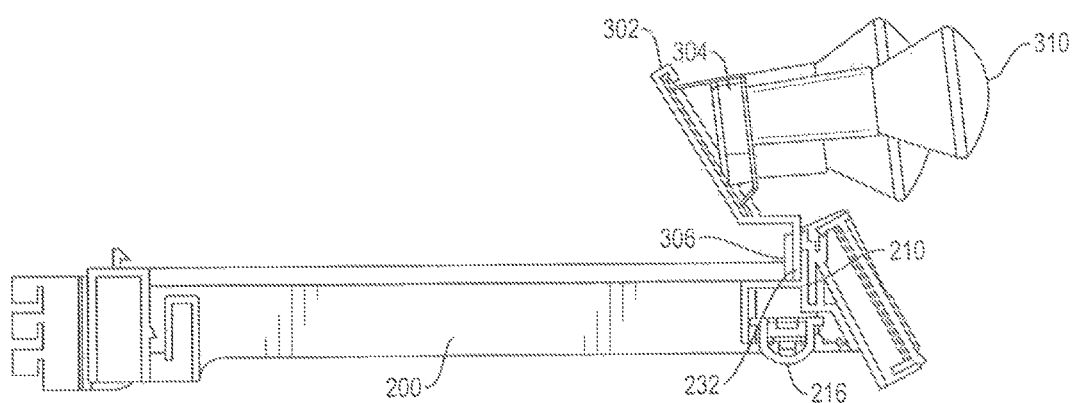
FIG. 9 depicts a side perspective view of an exemplary embodiment of one of the reconfigurable shelf assemblies configured as the assembled brush display shelf assembly.

FIG. 9 depicts a side perspective view of an exemplary embodiment of one of the reconfigurable shelf assemblies 106 configured as the assembled brush display shelf assembly 104. The brush holder 302 can be secured to the front wall 210 of the base frame by engaging the terminal end 306 of the brush holder 302 with the channel 232 of the base frame 200 such that the channel receives and selectively retains the terminal end 306 of the brush holder 302. In some embodiments, the terminal end 306 can be removably attached to the channel 232 by an interlocking fit. For example, the terminal end 306 can be configured to clip into the channel 232. In some embodiments, the terminal end 306 can be attached to the channel 232 by a friction fit. For example, the terminal end 306 can be slid into the channel 232 from one of the sides of the channel 232 and the channel walls can press against the terminal end 306. In some embodiments, the light source module 216 may be disposed and selectively coupled to the base frame 200 along the underside outer surface of the front wall 210 of the base 200.

In exemplary embodiments, the brush shroud 304 can hold a plurality of brushes with varying brush geometries. In some embodiments, the brush shroud 304 can be configured to receive and hold one or more brushes 310 in an orientation parallel to the base frame 200 and/or can be configured to receive and hold the one or more brushes 310 at a non-parallel angle with respect to the base frame 200. In an exemplary embodiment, the brush shroud 304 may be configured to support the underside of the brush 310 and have a support structure contoured around the periphery of the brush 310. The brush shroud 304 is configured to expose the top surface of brush 310. In an alternate embodiment, the brush shroud 304 may be configured to interface with a rearward end of the brush 310. The brush shroud 304 may be configured to encircle the rearward end of the outer surface of the brush 310 diameter. Alternatively, brush shroud 304 may be configured to hold alternative cosmetic application, removal, or refinement devices.

Figure 10:
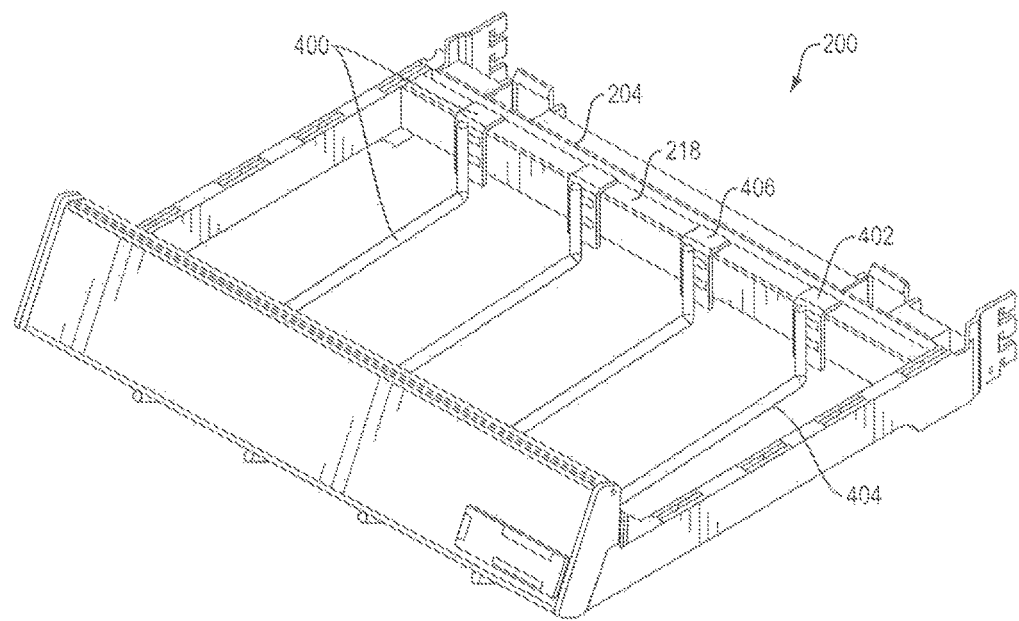
FIG. 10 depicts a front perspective view of an exemplary embodiment of one of the reconfigurable shelf assemblies that includes an assembled elongated post assembly.

FIG. 10 depicts a front perspective view of an exemplary embodiment of one of the reconfigurable shelf assemblies 106 configured as the peg hook shelf assembly 108. The peg hook shelf assembly 108 can include the universal base frame 200 and peg hooks 400 (e.g., shelving components or object support structures) that form an elongated post display portion. In exemplary embodiments, the peg hooks 400 can include bracket portions 402, and elongated post portions 404. The bracket portions 402 and the elongated post portions 404 can be formed using any suitable materials including, for example, plastics, metal, acrylic, fiberglass, and the like. In some embodiments, the elongated post portions 404 can be coupled to and/or integrally formed with the bracket portions 404 to form the display portion of shelf assembly 108.

The bracket portions 404 of the peg hooks 400 can be configured to engage and receive the rear rail 218 of the base frame 200 to removably couple the peg hooks 400 to the base frame 200. For example, the bracket portions 402 of the peg hooks 400 can have a generally U-shaped configuration defining an inner receiving area such that the inner receiving area of the bracket portions 402 receives the rail 218. The ribs 226 (FIG. 5) extending from the rear wall 204 can be configured to align the bracket portions 402 along a length of the rail 218 to space the peg hooks 400 away from each other and/or to provide a uniform distance between adjacent peg hooks 400. In an exemplary embodiment, the peg hooks 400 can be detached from the rear rail 218 of the base frame 200 urging and/or lifting the peg hooks 400 upwardly to disengage the bracket portions 402 of the peg hooks from the rail 218.

In some embodiments, when the peg hooks 400 are coupled to the base frame 200, the elongated post portions 404 can extend from rear rail 218 towards and beyond the front wall 210 of the base frame 200. In some embodiments, the elongated post portions 404 may not extend past the base frame front wall 210 or can extend forward from the rear rail 218 towards or beyond the front wall 210 at varying lengths.

Figure 11:
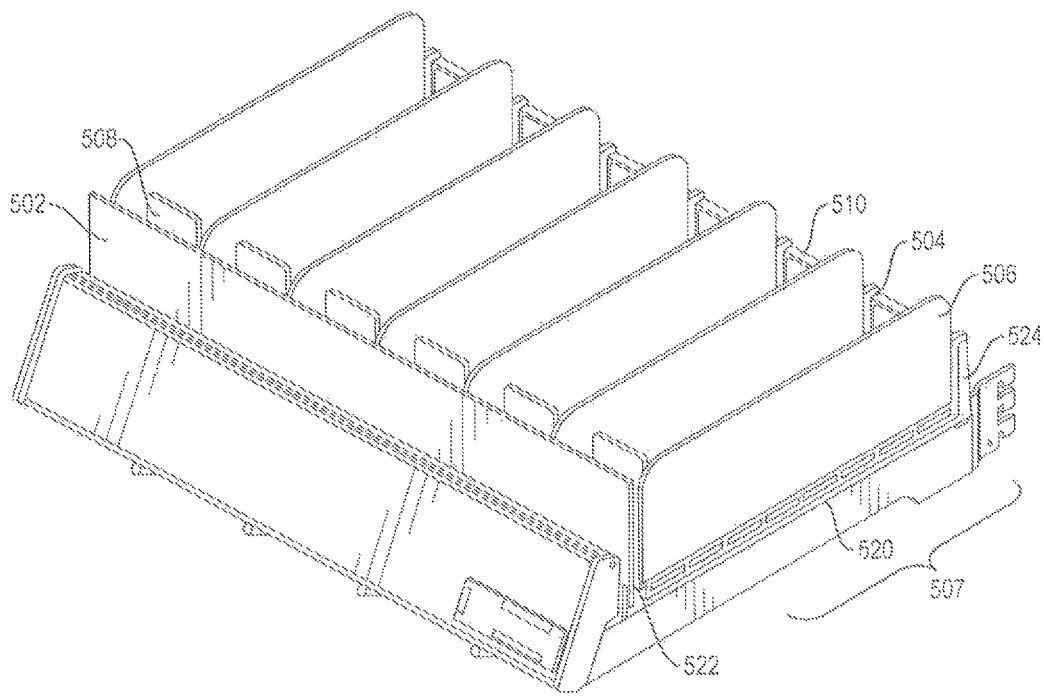
FIG. 11 depicts a front perspective view of an exemplary embodiment of one of the reconfigurable shelf assemblies configured as a divider tray shelf assembly.

FIG. 11 depicts a front perspective view of an exemplary embodiment of one of the reconfigurable shelf assemblies 106 configured as the divider tray shelf assembly 110.

As shown in FIG. 11, the divider tray shelf assembly 110 can include the base frame 200 and shelving components (e.g., object support structures) in the form of dividers 506 and a divider tray insert 507. In some embodiments, the divider tray insert 110 can include pusher assemblies 508. The divider tray insert 507 can include a front retaining wall 502, a rear retaining wall 504, and a bottom surface 520. The dividers 506 can extend between the front retaining wall 502, the rear retaining wall 504 and the bottom surface 520. In some embodiments, the front retaining wall 502 and rear retaining wall 504 can be configured to have similar geometries while in other embodiments, the front retaining wall 502 and the rear retaining wall 504 may have varying geometries along a front edge 522 and a rear edge 524. In some embodiments, the dividers 506 can be opposingly spaced and can extend parallel to each other. Furthermore, the front retaining wall 502 and the rear retaining wall 504 can be opposingly spaced and can extend parallel to each other. The dividers 506 can generally extend perpendicularly from the front retaining wall 502 to the rear retaining wall 504. In some embodiments, the dividers 506 can be a uniform height and/or can vary in height.

Figure 12:
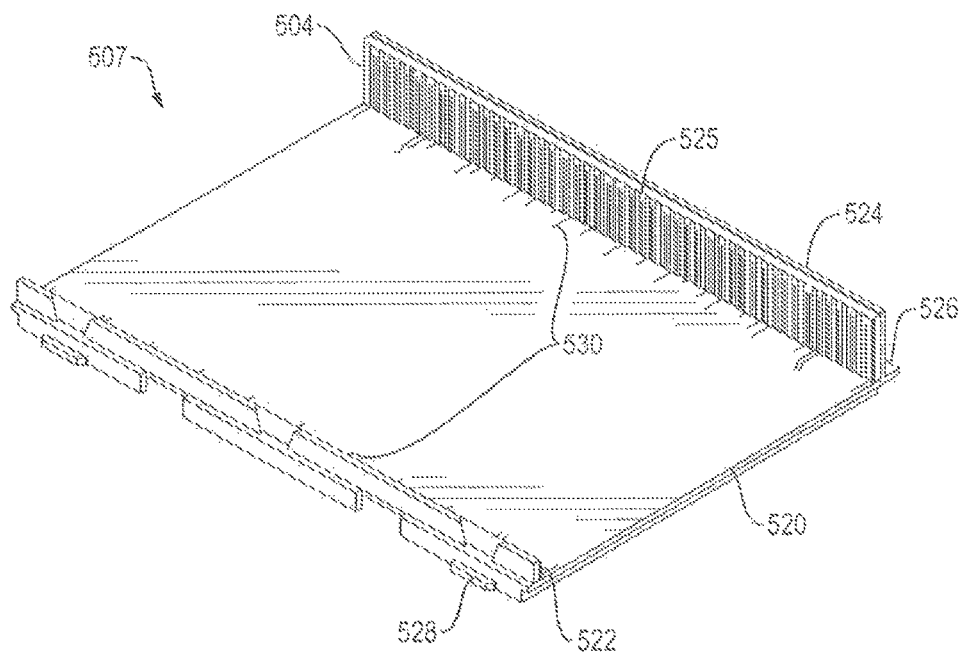
FIG. 12 depicts a front perspective view of an exemplary embodiment of a bottom insert of a divider tray shelf assembly.
Figure 13:
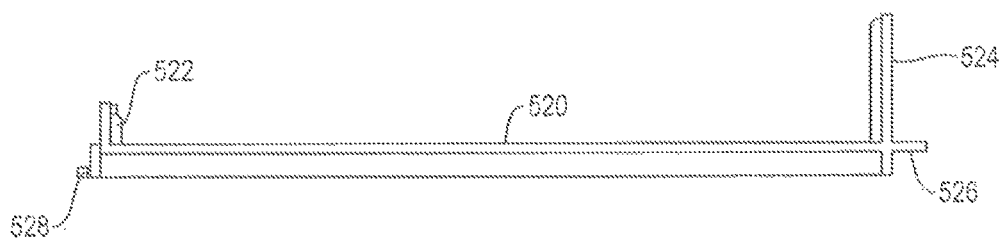
FIG. 13 depicts a side perspective view of an exemplary embodiment of a bottom insert of a divider tray shelf assembly.

FIG. 12 depicts a front perspective view of an exemplary embodiment of the divider tray insert 507 without the front retaining wall 502, dividers 506, and pusher assemblies 508. FIG. 13 depicts a cross-sectional side view of an exemplary embodiment of the divider tray insert 507 of FIG. 12. As shown in FIGS. 12 and 13, the bottom surface 520 extends between the front edge 522 and the rear retaining wall 504. The front edge 522 and the rear retaining wall 504 can be opposingly spaced and can extend parallel to each other. In exemplary embodiments, an inner surface of the rear retaining wall 504 (e.g. the surface facing the front edge 522) and/or an inner surface of the front edge 522 (e.g., the surface facing the rear retaining wall 504) can include ridges 524 extending vertically and generally perpendicularly with respect to the bottom surface 520. The ridges 524 can be distributed across a length of the rear retaining wall 504 and/or across a length of the front edge 522. Channels 525 can be formed between adjacent ridges 524 to form, for example, alignment slots that can be configured to receive, or align, the dividers 506 and/or pusher assemblies 508 described herein with each other, the divider tray insert 507, or the base frame 200. In some embodiments, the bottom surface 520, the front edge 522 and/or the rear retaining wall 504 may be configured with a numbering system, a marking system, an indexing system, or a configuration mechanism associated with the ridges 524 and/or channels 525, which can be referenced and utilized to adapt the divider tray shelf assembly 110 to a plurality of configurations for modular reconfiguration of the shelf assembly 110 so that the shelf assembly can be reconfigurable to accommodate different product arrangements.

The front edge 522 of the divider tray insert 507 can include mating tabs 528 formed at and extending forwardly from a lower portion of the front edge 522. The mating tabs 528 can be configured to engage the slots 240 formed in the base frame 200 (FIG. 3). In some embodiments, the divider tray insert 507 can include two mating tabs 528. One of the mating tabs 528 can be disposed proximate to a side of the front edge 522 and one of the mating tabs can be disposed proximate to the other side of the front edge 522. The slots 240 of the base frame 200 can be configured to selectively retain the mating tabs 528 to removeably couple the divider tray insert 507 to the base frame 200.

One or more mating tabs 526 can extend outwardly from a lower portion of the rear retaining wall 504 in a rearward direction. In some embodiments, the one or more mating tabs 526 can be formed as single continuous lip portion extending across the length of the rear retaining wall 504. The lip can be configured to engage the resilient detent members 224 formed in the base frame 200 (FIG. 3) and the resilient detent members 224 can selectively retain the lip to removeably couple the divider tray 507 to the base frame 200.

Figure 14:
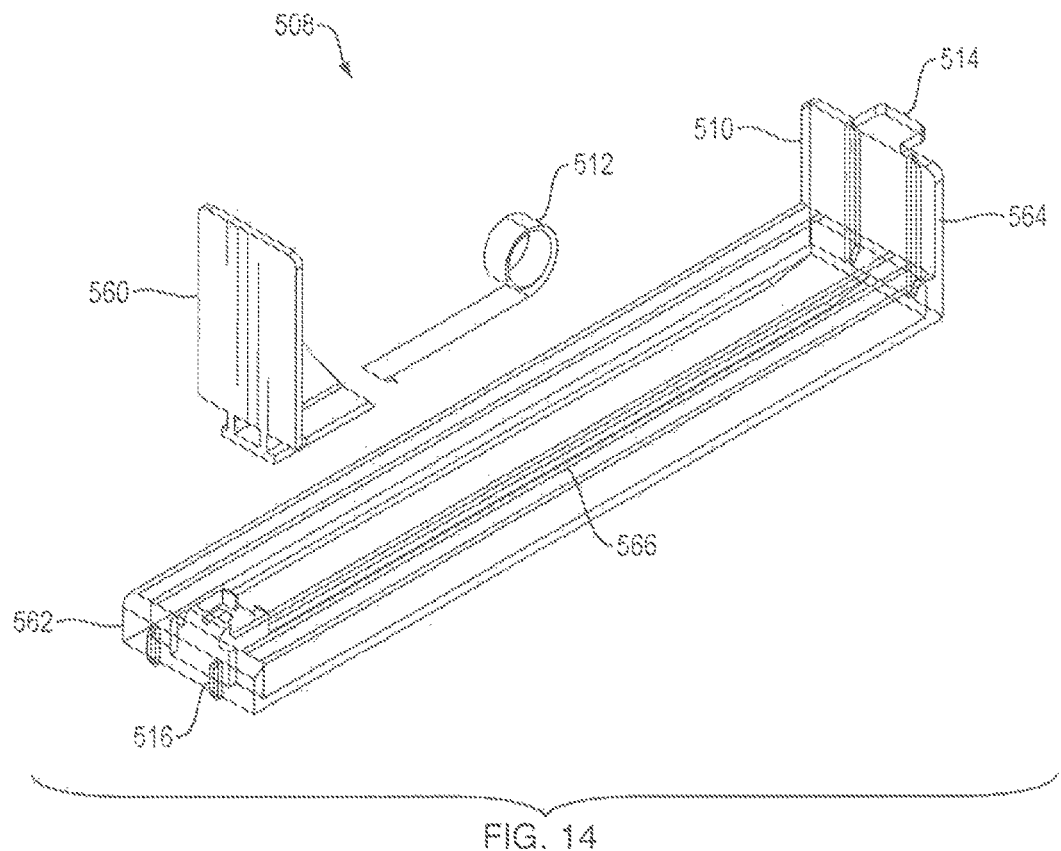
FIG. 14 depicts a front perspective view of an exemplary embodiment of a pusher assembly that can be configured to the bottom insert of a divider tray shelf assembly.

FIG. 14 depicts a partially exploded front perspective view of an exemplary embodiment of one of the pusher assemblies 508 that can be detachably coupled to the divider tray insert 507. As shown in FIG. 14, the pusher assembly 508 includes a pusher track 510 having a length that extends between a front end 562 and a rear end 564, a pusher paddle 560, and a coil spring 512. The pusher track 510 can include a pusher track channel 566 extending between the front surface 562 and the rear surface 564, which can be configured to receive the pusher paddle 560 and/or the coil spring 512. For example, pusher panel 560 can engage the pusher track channel 566 and the pusher track channel can guide the pusher panel along the pusher track 510 between the front end 562 and the rear end 564. One end of the coil spring 512 can be operatively coupled to the pusher paddle 560 and the other end of the coil spring 512 can be disposed proximate to the rear end 564 of the pusher track 510. The coil spring 512 can be configured to provide a resistive force against the pusher paddle 560 to bias the pusher paddle 560 towards the front end 562 of the pusher track 510. The pusher paddle 560 can be urged towards the rear end 564 of the pusher track 510 by overcoming the spring force applied to the pusher paddle 560 by the coil spring 512. For example, one or more cosmetic products or other products can be loaded into the pusher assembly 508 in front of the pusher paddle 560 to urge the pusher paddle towards the rear end 564 of the pusher track 510. When one of the cosmetic products or other products is removed from the pusher assembly 508, the spring force of the coil spring 512 can urge the pusher paddle 560 forward towards the front end 562 of the pusher track so that the cosmetic products or other products remaining in the pusher assembly are urged towards the front end 562 of the pusher track 510. In exemplary embodiments, the pusher assembly 508 may include alternate embodiments having different heights and widths to accommodate varying sizes of products to be supported by the pusher assembly.

The front end 562 can include a projections 516 extending from the front end 562 in a forward direction. The projections 516 can be dimensioned and configured to mate with the channels 525 formed by the ridges 524 in the front edge 522 of the divider tray insert 507 (FIG. 12) to detachably couple the pusher assembly 508 to the divider tray insert 507 and/or to align the pusher assembly 508 with respect to the divider tray insert 507, the base frame 200, other pusher assemblies 508, and/or divider 506. For example, a user can determine a position at which the pusher assembly 508 is to be installed in the divider tray insert 507 and can align the projections 516 with the channels and urge the pusher assembly 508 downward towards the bottom surface 520 to engage the projections 516 with the channels 525.

The rear end 564 can include projections 518 extending from the rear end 564 in a rewardly in a direction away from the front edge 522. The projections 518 can be dimensioned and configured to mate with the channels 525 formed by the ridges 524 in the rear retaining wall 504 of the divider tray insert 507 (FIG. 12) to detachably couple the pusher assembly 508 to the divider tray insert 507 and/or to align the pusher assembly 508 with respect to the divider tray insert 507, the base frame 200, other pusher assemblies 508, or divider 506. For example, a user can determine a position at which the pusher assembly 508 is to be installed in the divider tray insert 507 and can align the projections 518 with the channels 525 and urge the pusher assembly 508 downward towards the bottom surface 520 to engage the projections 518 with the channels 525. Thus projections 516 and 518 along with the channels 525 can selectively couple the pusher assembly to the divider tray insert 507 and can align the pusher assembly with respect to the divider tray insert 507, the base frame 200, other pusher assemblies 508, and/or divider 506.

Figure 15:
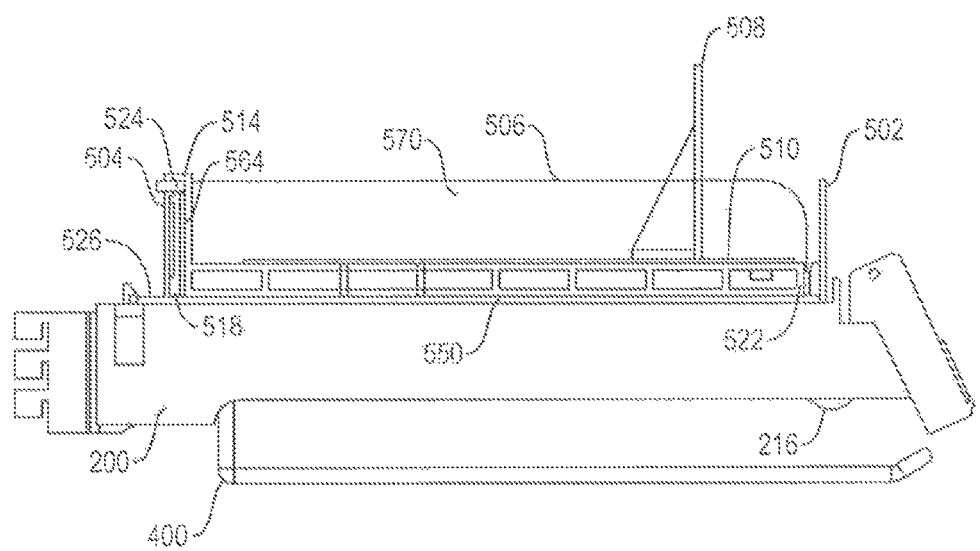
FIG. 15 depicts a side view of an exemplary embodiment of a divider tray shelf assembly in accordance with exemplary embodiments of the present disclosure.

FIG. 15 depicts a side view of an exemplary embodiment of the divider tray shelf assembly 110 showing a pusher assembly 508 configured to the divider tray insert 507 that is operatively coupled to the base frame 200. In some embodiments, the divider tray shelf assembly 110 can include the peg hooks 400 as described herein with reference to FIG. 10. In some embodiments the pusher assembly 508 can be detachably coupled to the front edge 522 of the divider tray insert 507 by the projections 516 located on front surface 562 of pusher track 510. The pusher assembly 508 can then be detachably coupled to the rear edge 524 of the divider tray insert 507 by the projections 518 located on the rear end 564. In exemplary embodiments, the light source module 216 may be disposed and selectively coupled to the base frame 200 along the underside outer surface of the front wall 210 of the base 200.

In exemplary embodiments, one or more of the dividers 506 can be detachably coupled to the divider tray insert 507. The dividers 506 can be retained in the divider tray insert 507 by corresponding and opposing pairs of the channels 525 formed in the front edge and rear retaining wall of the divider tray insert 507 such that the dividers 506 extend from the front retaining wall 502 to the rear retaining wall 504 of the of the divider tray insert 507. For example, the dividers 506 can be coupled to the divider tray insert 507 by a friction fit between the dividers 506 and the channels 525. In some embodiments, the dividers 506 can be coupled to the divider tray insert 507 using a press fit, a recess, a snap fit, and/or using any other suitable attachment mechanisms. The dividers 506 can be an injection molded panel, a machined panel or the like. The dividers 506 can be mounted along the outer perimeter of the divider tray insert 507 to form side walls 570 of the divider tray assembly 110 and/or can be mounted between an adjacent pusher track assemblies 508 to separate the pusher track assemblies. The dividers 506 can be opposingly spaced and placed parallel to one another extending perpendicularly from the rear retaining wall 504 to the front retaining wall 502.

Figure 16:
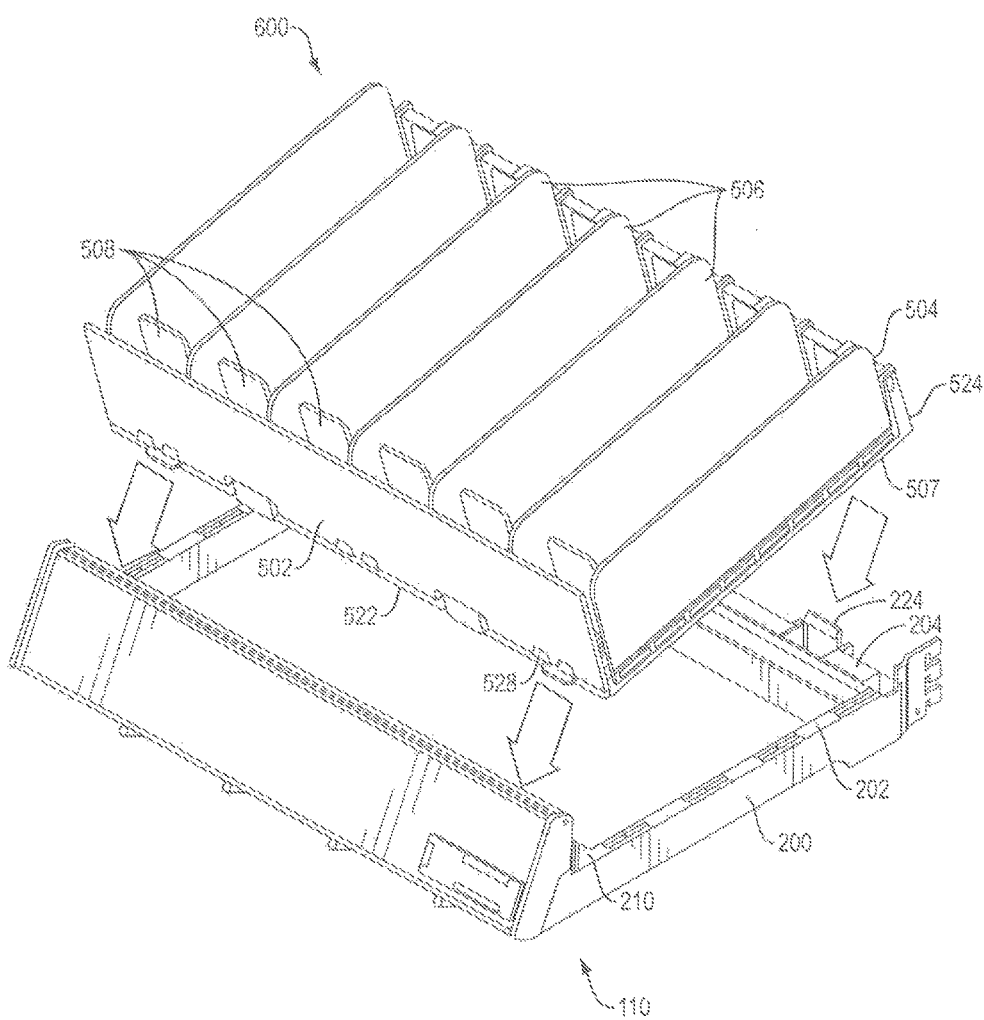
FIG. 16 depicts an exemplary assembled divider tray mating to an exemplary embodiment of a universal base frame.

FIG. 16 depicts an attachment of divider tray insert 507 as described in FIGS. 11 and 15, mating to the base frame 200. As further described herein, the divider tray insert 507 can be configured to include the pusher assembly 508, the rear retaining wall 504, the front retaining wall 502, and the dividers 506. In some embodiments, the divider tray insert 507 can be inserted front edge 522 first into the base frame 200. The front edge 522 can be configured with mating tabs 528 which can be operatively coupled to the front wall 210 of the base frame 200 via the slots 228 described herein. The rear edge 524 of the divider tray insert 507 can be operatively coupled to the rear wall 204 of the base frame 200. For example, as described herein, the rear wall 204 can be configured with resilient detent members 224 to selectively retain the divider tray insert 507 to the base frame 200. The bottom surface 520 can be seated on the side walls 202 of the base frame 200. The mating tab 526 can displace the resilient detent members 224 from their normal positions as the corresponding mating tab 526 engages the resilient detent members 224. The resilient detent members 224 can return to their normal positions after the corresponding mating member (e.g., mating tab 526) is fully received the detent members 224 forming a latch to selectively retain the divider tray insert 507 to the base frame 200.

Figure 17:
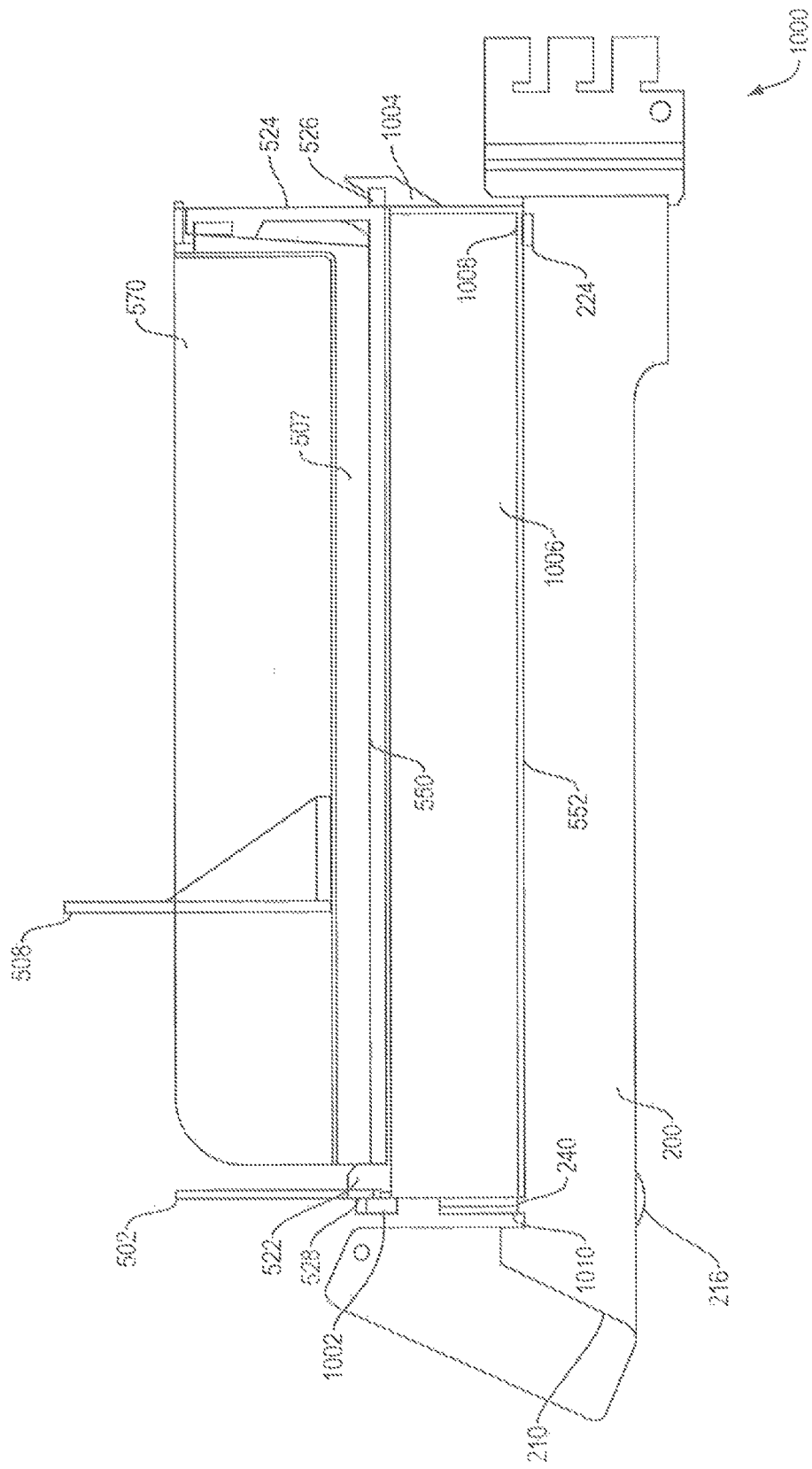
FIG. 17 depicts a side perspective view of an exemplary lifter tray coupled to an exemplary divider tray and an exemplary embodiment of a universal base frame.

FIG. 17 depicts a side view of another exemplary embodiment of the divider tray shelf assembly 110 in which a lifter tray 1006 is operatively coupled between the base frame 200 and the divider tray insert 507. The lifter tray 1006 can space the divider tray insert 507 away from the base frame 200.

The bottom surface of the divider tray insert 507 can be mounted flush to a top surface 550 of the lifter tray 1006. A bottom surface 552 of the lifter tray 1006 can be flush mounted to the base frame 200. In exemplary embodiments, the light source module 216 may be disposed and selectively coupled to the base frame 200 along the underside outer surface of the front wall 210 of the base 200.

The lifter tray 1006 can include mating members 1008 in the form of projections similarly structured to the mating tabs 526 of the divider tray insert 507, which can be disposed proximate to a lower rear end 1008 of the lifter tray 1006. The mating members 1008 can be configured to interact with the resilient detent members 224 which can receive the mating members to selectively retain the lifter tray 1006 to the base frame 200. Likewise, the lifter tray 1006 can include mating members 1010 in the form of projections similarly structured to the mating tabs 528 of the divider tray insert 507, which can be disposed proximate to a lower front end 1010 of the lifter tray 1006. The mating members 1010 can be received by the slots 240 formed proximate to the front wall 202 of the base frame 200 to selectively retain the lifter tray 1006 to the base frame 200. The top surface 550 of the lifter tray 1006 can be configured with an upper rear detent member 1004 that can receive mating tab 526 of the divider tray 110 and slots 1002 disposed proximate the front portion of the lifter tray 1006 can receive the mating tabs 528 of the divider tray insert 507.

In some embodiments, the lifter tray 1006 can have varying attachment structures including reinforced support structures extending from the front wall 210 of the base frame 200 toward the rear wall 204 of the base frame 200. The lifter tray 1006 can have a modular construction allowing varying configurations to be used with the base frame 200 and divider tray insert 507. The lifter tray 1006 can have varying heights to elevate a product supported by the divider tray insert 507 above the front wall 210 of the base frame 200.

Figure 18:
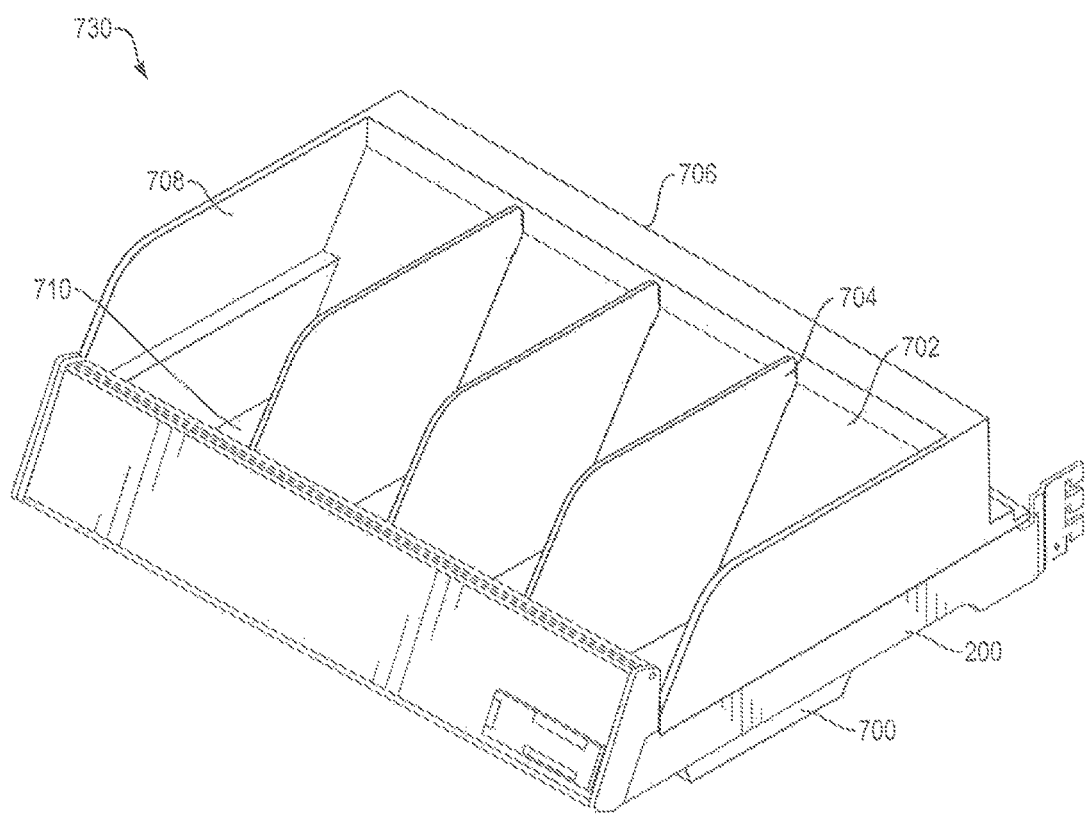
FIG. 18 depicts a front perspective view of an exemplary embodiment of a reconfigurable shelf assembly configured as an assembled bon bon tray shelf assembly.

FIG. 18 depicts a front perspective view of an exemplary embodiment of one of the reconfigurable shelf assemblies 106 configured as the assembled bon bon tray shelf assembly 112. A bon bon tray is a type of merchandise fixture that includes at least one compartment configured to support products in a loosely stacked configuration. The bon bon tray shelf assembly 112 can include the universal base frame 200 and a bon bon tray 730. In exemplary embodiments, the tray 730 can include a bottom surface 700, a rear wall 702, a divider 704, a rear support structure 706, an upper side wall support 708, and a lower side wall 710 (e.g., shelving components or object support structures). The tray 730 can be detachably coupled to the base frame 200. The bottom surface 700 extending below the base frame 200. The shelving components 700, 702, 704, 706, 708, 710 can be formed using any suitable materials including, plastic, metal, acrylic, fiberglass, and the like. The tray assembly 730 can be configured with attachment members that can be selectively coupled to the base frame 200.

Figure 19:
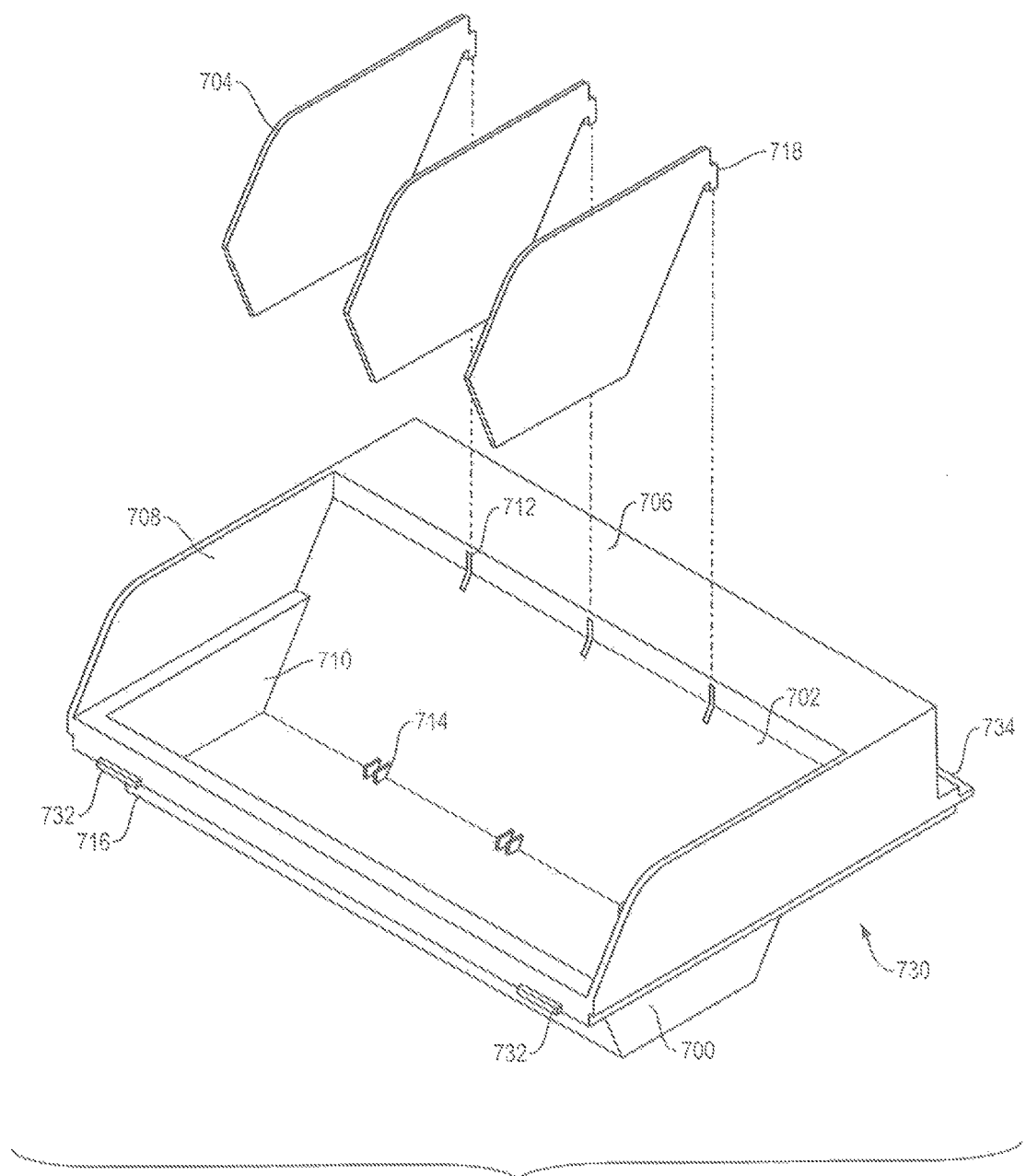
FIG. 19 depicts a front perspective view of an exemplary embodiment of a reconfigurable shelf assembly configured with the components to form an assembled bon bon tray shelf assembly.

FIG. 19 depicts an exploded front perspective view of an exemplary embodiment of the bon bon tray 730. In some embodiments, the rear wall 702 can extend upwardly from the bottom surface 700. The front wall 716 can include mating members 732 in the form of projections similarly structured to the mating tabs 528 of the divider tray insert and configured to be received by the slots 240 of the base frame 200 to detachably couple the tray 730 to the base frame 200. Likewise, the rear wall 702 can include mating members 734 in the form of a lip similarly structured to the mating tab 526 of the base frame and configured to be received by the resilient detent members 224 of the base frame to detachably couple the tray 730 to the base frame 200.

In some embodiment, the tray 730 can include alignment members 712, 714 configured to receive a divider 704. For example, the alignment member 712 can be a slot disposed along the top edge of rear wall 702 and/or the alignment members 714 can be a pair of protrusions disposed along an edge formed between the bottom surface 700 and the rear wall 702. The corresponding divider 704 can be configured with a notch 718 to mate with the alignment member 712 to facilitate attachment of the divider 704 to the tray 730 to form sections within the tray 730 and the alignment members 714 can receive a bottom edge of the divider 704 to align the divider with respect to the tray 730 and to facilitate retention of the divider 704 by the tray 730.

Figure 20:
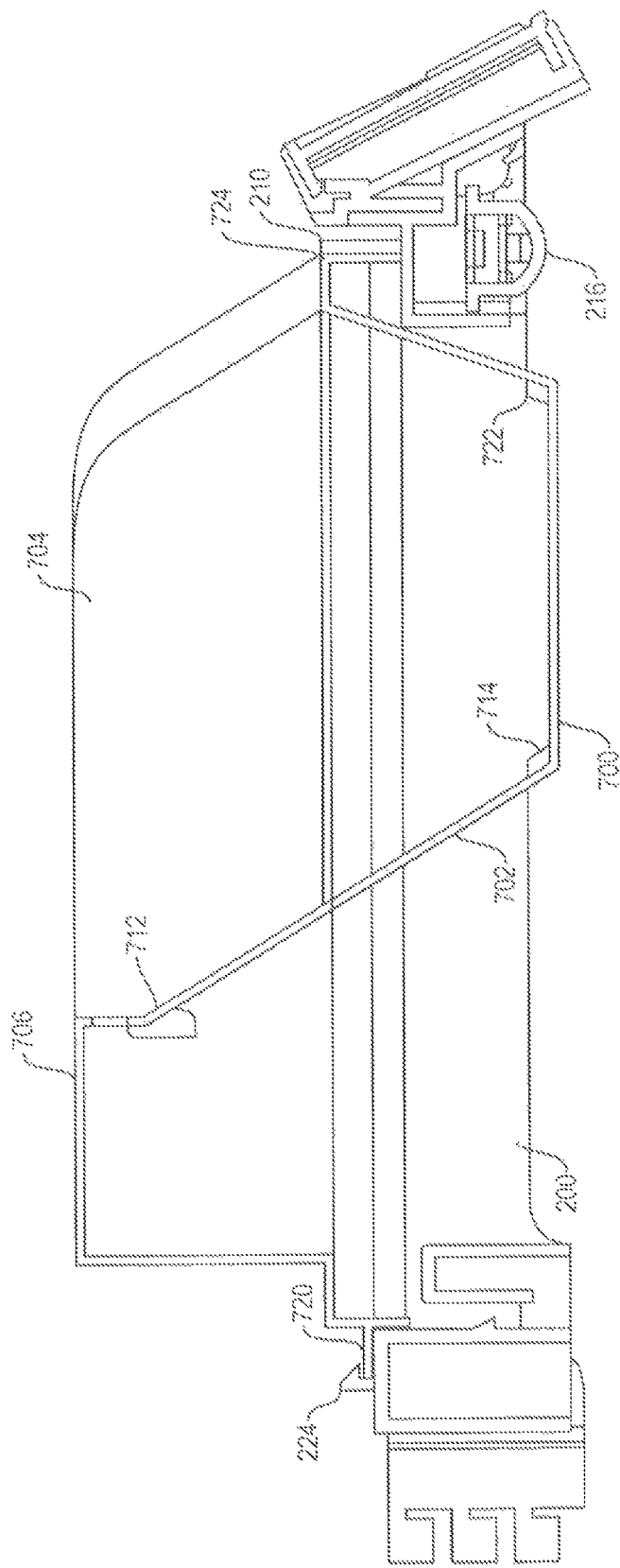
FIG. 20 depicts side a perspective view of an assembled base frame coupled to a tray to form a bon bon tray.

FIG. 20 depicts a cross-sectional side view of the assembled bon bon tray shelf assembly 112. As shown in FIG. 20, the tray 730 can be attached to the base frame 200 from the front wall 716 by flush mounting the front surface 724 proximate to the front wall 210. As shown in FIG. 14, the mating members 732 are configured to detachably couple to the corresponding mating slots 240 of the base frame 200 and the rear wall 706 can be detachably coupled to the base frame 200 at the mating members 734 by coupling the mating member 734 to the resilient detent members 224 of the base frame 200. In exemplary embodiments, the light source module 216 may be disposed and selectively coupled to the base frame 200 along the underside outer surface of the front wall 210 of the base 200.

In some embodiments, the tray 730 can be configured with a plurality of object holding areas 712, 714, 722 configured to receive a plurality of dividers 704. For example, an object holding area 712 can be disposed along the top edge of rear wall 702, or an object holding area 714 can be disposed along the mating edge of the bottom surface 700 to the rear wall 702 or an object holding area 722 can be disposed along the mating edge of the bottom surface 700 to the front wall 716. In exemplary embodiments, the tray 730 may include alternate embodiments having different heights and widths to accommodate varying sizes of products. In exemplary embodiments products having spherical characteristics, cylindrical characteristics, or a shape of a bon bon candy can be place within the bon bon tray shelf assembly 112.

Figure 21:
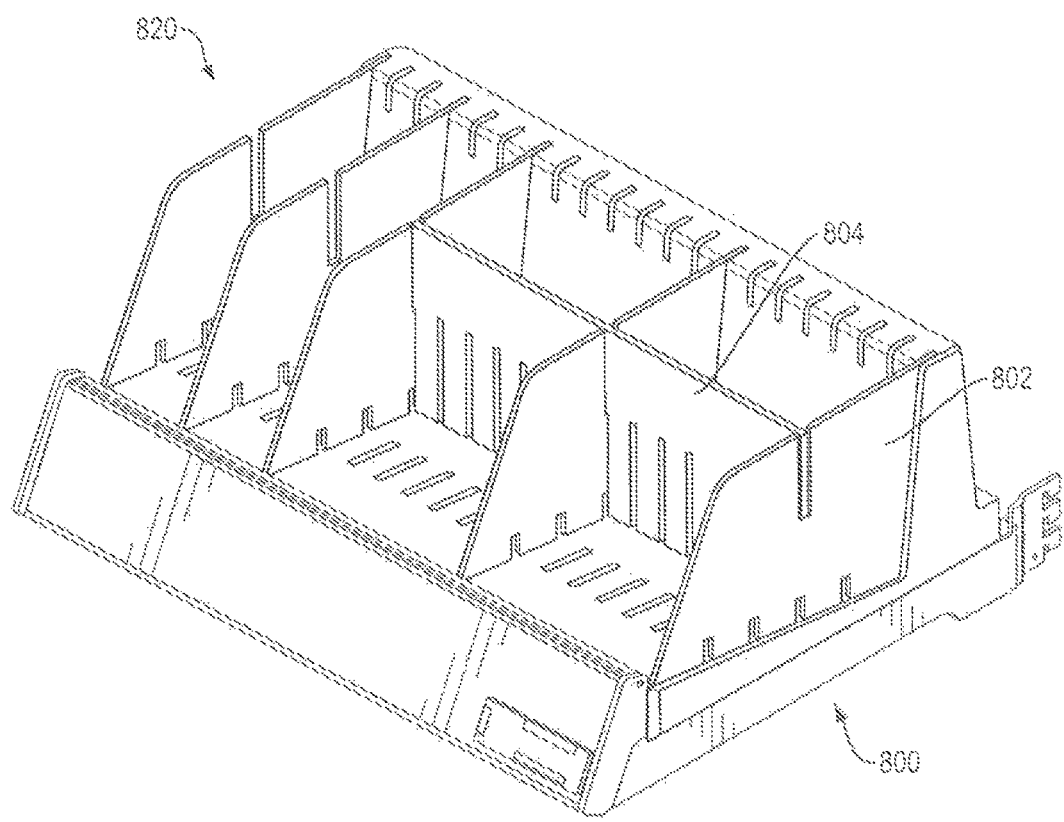
FIG. 21 depicts a front perspective view of an exemplary embodiment of a reconfigurable shelf assembly configured as an assembled trim tray shelf assembly.

FIG. 21 depicts a front perspective view of an exemplary embodiment of one of the reconfigurable shelf assemblies 106 configured as the assembled trim tray shelf assembly 114. A trim tray is a type of merchandise fixture that can have multi-level compartments that can hold and support one or more products. The trim tray assembly 114 can include the universal base frame 200 and shelving components (e.g., or object support structures), such as a first and a second surface 800, a first divider 802, and a second divider 804. The trim tray components 800, 802, 804 can form a trim tray assembly 820 and can be formed using any suitable materials including, plastic, metal, fiberglass, acrylic, and the like. The trim tray assembly 820 can be configured with attachment members that can be selectively coupled to the base frame 200. In exemplary embodiments, the trim tray shelf assembly 114 may include alternate embodiments having varying spacing, producing different height and width compartments to accommodate varying sizes of products.

Figure 22:
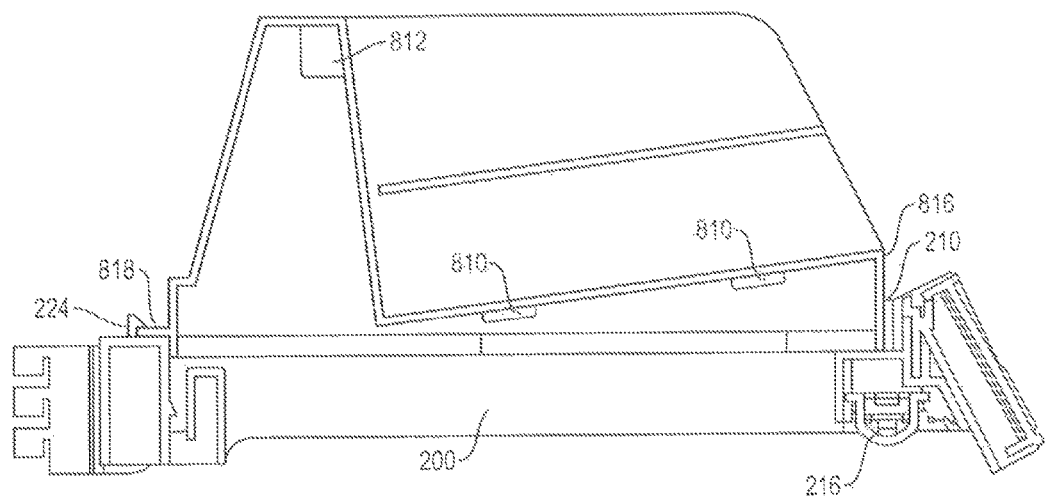
FIG. 22 depicts side perspective view of an assembled base frame coupled to a trim tray to form an assembled trim tray shelf assembly.

FIG. 22 depicts a cross-sectional side view of an assembled embodiment of the trim tray shelf assembly 114. As shown in FIG. 22, the trim tray 820 can be attached to the base frame 200 from the front wall 816 by flush mounting the front wall 816 proximate to the front wall 210 of base frame 200. As shown in FIG. 22, the rear wall 706 can be attached to the base frame 200 in a similar manner to embodiments described herein. For example, mating tabs 818 can be selectively retained by resilient detent members 224 of base frame 200. In exemplary embodiments, the light source module 216 may be disposed and selectively coupled to the base frame 200 along the underside outer surface of the front wall 210 of the base 200.

Figure 23:
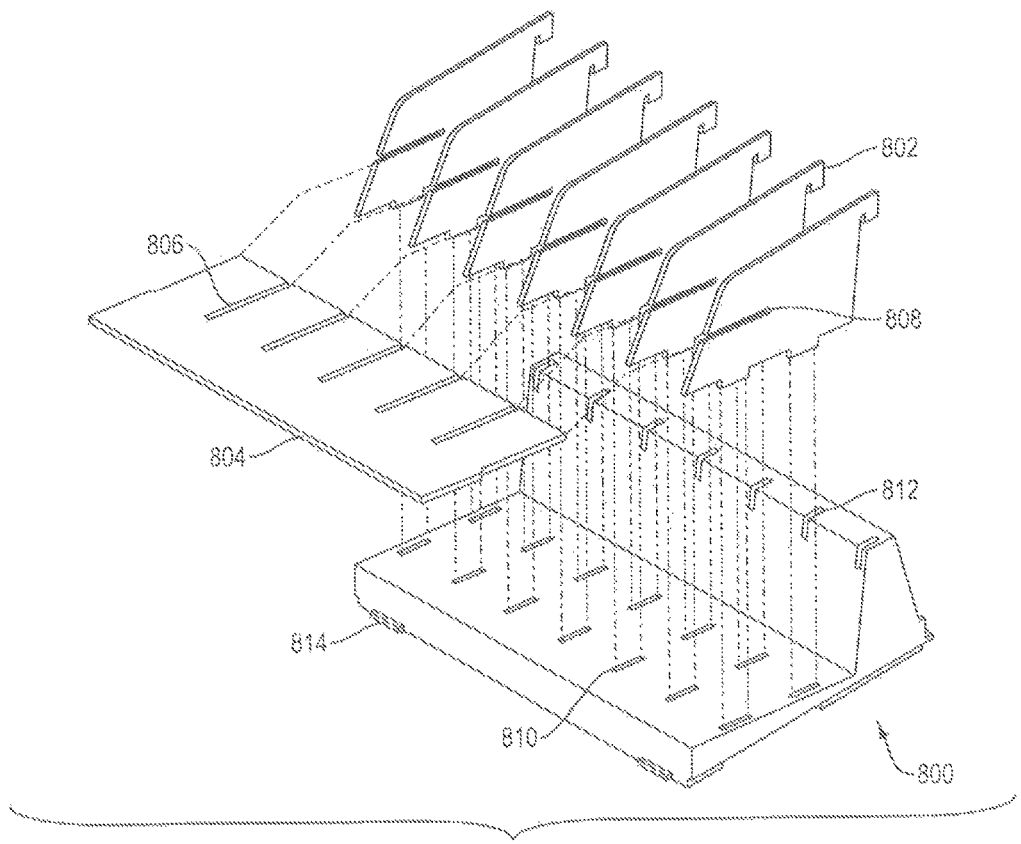
FIG. 23 depicts a front perspective view of an exemplary embodiment of a reconfigurable shelf assembly configured as an assembled trim tray shelf assembly.

FIG. 23 depicts a front perspective view of an exemplary embodiment of one of the reconfigurable shelf assemblies 106 configured as the assembled trim tray shelf assembly 114. As shown in FIG. 23, a front portion of the tray assembly 820 includes mating tabs 814 configured to detachably couple to the corresponding first mating area the base frame 200 (e.g., slots 240). The trim tray assembly 820 has a first surface extending in a horizontal plane from the base frame front wall 210 to the rear edge 204 of the base frame 200. The trim tray 800 can have a second surface extending in a vertical plane from the first surface where the second surface is configured to detachably couple to the rear edge 204 of the base frame 200 as described herein. In some embodiments, the trim tray 114 can include multiple trim tray dividers 802 configured to be detachably coupled to the vertical and the horizontal surfaces of the trim tray 800.

In some embodiments, the trim tray sub dividers 804 can be configured to detachably couple to the horizontal surface of the trim tray 800 and the trim tray divider 802. The trim tray 114 can be configured with multiple settings for modular reconfiguration. In some embodiments, the trim tray sub divider 804 can be configured to be detachably coupled to the vertical surface of the trim tray 800 and the trim tray divider 802. The trim tray divider 802 and trim tray sub divider 804 can be configured to attach to the trim tray 800 by a friction fit or a snap fit using slots, channel ribs or the like.

FIG. 24 depicts a front perspective view of an exemplary embodiment of one of the reconfigurable shelf assemblies 106 configured as an assembled slide roll tray shelf assembly 900. As slide roll tray is a type of multi-tiered merchandise fixture where each tier can support a row of products and can be pitched downwardly from a rear of the tray to a front of the tray such that the products in a tier roll forward when a product at the front of the tier is removed. As shown in FIG. 24, the slide roll tray shelf assembly 900 can include the base frame 200, the divider tray 507, and slide roll portions 905 (e.g., shelving components or object support structures). The slide roll portions 905 can be formed of a first vertical member 902 and a second vertical member 904 can be opposingly spaced and can extend parallel to each other extending upward from the side wall 202 of the divider tray 507. The vertical members 902 and 904 can engage the channels formed in the divider tray 507 to selectively couple the vertical members 902 and 904 to the divider tray 507. In exemplary embodiments the first vertical member 902 and second vertical member 904 can be positioned with ledges 906 extending inwards from the first vertical member 902 and second vertical member 904. The ledges 906 can be configured at an angle where the rear portion of the ledge 910 is vertically higher than the front portion of the ledge 908. The front portion of the ledge 908 can have an lip extending upwardly from the front portion of the ledge in a direction opposite a floor when the shelf assembly 900 is mounted to an embodiment of the merchandise wall system 100 (FIGS. 1A and 1B). The sloped angle of the ledge can allow products in the front position to rest below the product in the rear portion of the ledge. Upon removal of the product in the front portion of the ledge, the remaining products can be forced into the position of the just removed product from the front of the ledge. The slide roll tray can be constructed from a plastic, metal, acrylic or the like.

Figure 25:
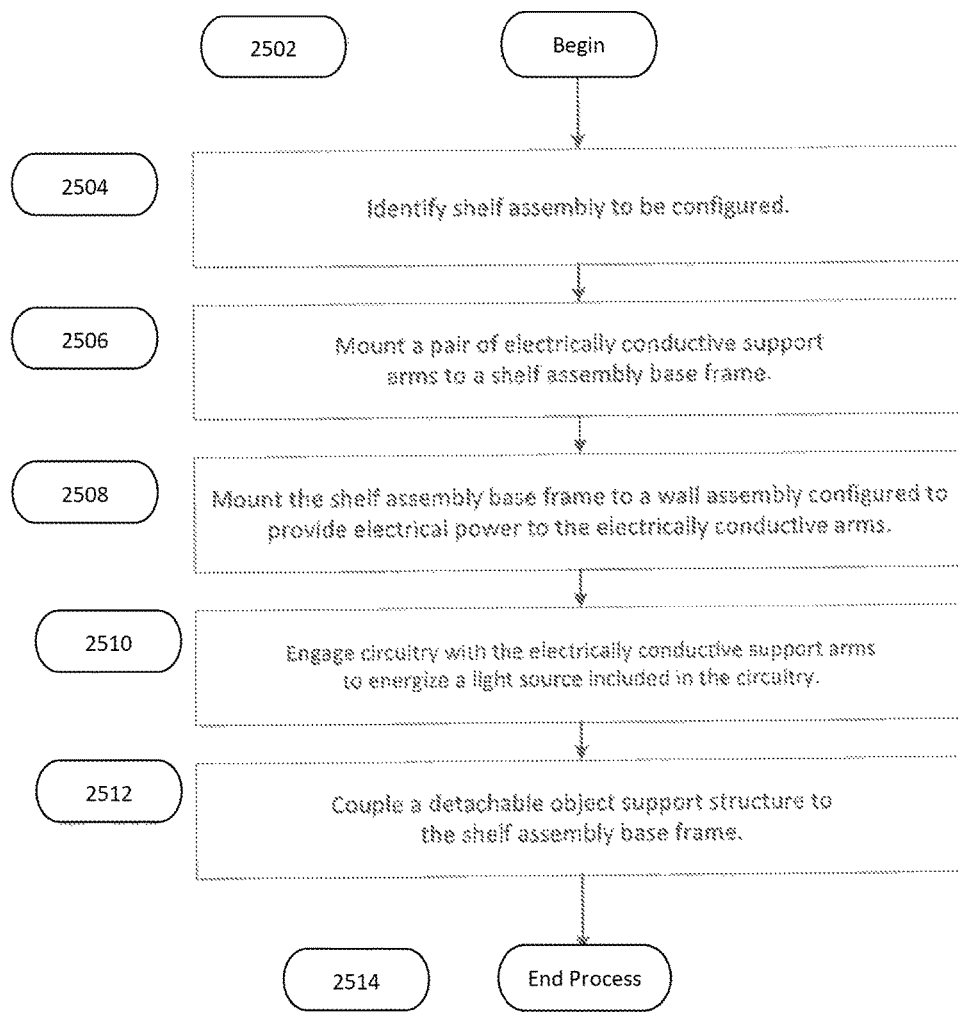
FIG. 25 is a flow diagram that illustrates a shelf assembly process in accordance with exemplary embodiments of the present disclosure.

FIG. 25 is a flow diagram that illustrates a shelf assembly process in accordance with exemplary embodiments of the present disclosure. For example, the shelf assembly components can include a base frame configured with an object support structures, such as a divider tray, pusher assembly, trim tray, a lifter tray, bon bon tray, a slide roll tray, a cubby bin, or any combination of object support structures.

At step 2502, the assembly method may begin. At step 2504, a shelf assembly can be identified for configuration. At step 2506, a pair of electrically conductive support arms can be mounted to a shelf assembly base frame. The pair of electrically conductive arms can extend longitudinally through side walls of the base frame and can extend outwardly from a rear of the shelf assembly base frame. The electrically conductive arms can be configured to be in electrical contact with circuitry operatively coupled to the base frame. In exemplary embodiments, the circuitry can include a light source. At step 2508, the shelf assembly base frame can be mounted to a wall assembly configured to provide electrical power to the electrically conductive arms. At step 2510, the circuitry can be engaged with the electrically conductive support arms to energize the light source. In exemplary embodiments, the circuitry can be held in electrical contact with the electrically conductive arms via a friction fit between the circuitry and the shelf assembly base frame. At step 2512, a detachable object support structure having a plurality of settings for modular reconfiguration can be coupled to the shelf assembly base frame. At step 2514 the process ends.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A reconfigurable shelf assembly, comprising:
    a shelf assembly base frame including:
        a rear side with a resilient detent member,
        a plurality of walls defining a perimeter, the plurality of walls including two opposing side walls that include arms with toothed fastening members for selectively mounting the shelf assembly base frame to a wall assembly,
        a rail extending proximate to the rear side of the shelf assembly base frame, and
        a slot in a front side for retaining a first shelving component or a second shelving component; the opposing side walls extending between the rear side and the front side;
    the first shelving component configured to support objects according to a first configuration; and
    the second shelving component configured to support objects according to a second configuration;
    wherein the first shelving component is detachably coupled to the shelf assembly base frame to facilitate removal and replacement of the first shelving component with the second shelving component to reconfigure the shelf assembly to support objects according to the second configuration; and wherein the resilient detent member is configured for retaining the first or second shelving components.

2. The shelf assembly of claim 1, further comprising:
the arms of the opposing side walls are a pair of electrically conductive support arms extending from the shelf assembly base frame to selectively mount the shelf assembly base frame to a wall assembly configured to provide electrical power to the electrically conductive arms; and
circuitry including a light source and a pair of conductive mounting members, the conductive mounting members selectively engaging the electrically conductive arms to energize the light source.

3. The shelf assembly of claim 1, wherein the shelf assembly base frame includes a first mating area and the first shelving component includes an object holding area and a second mating area, the second mating area being configured to interact with the first mating area to detachably couple the first shelving component to the shelf assembly base frame, the object holding area being configured to hold an object relative to the shelf assembly base frame.

4. The shelf assembly of claim 1, wherein the shelf assembly base frame includes a channel proximate to a front of the shelf assembly base frame and the shelf assembly further comprises:
a brush holding portion having an edge forming the second mating area and face configured to hold a brush relative to the shelf assembly base frame,
wherein the channel is configured to receive the edge to detachably couple the brush holding portion to the shelf assembly base frame.

5. The shelf assembly of claim 1, wherein the shelf assembly further comprises:
an elongate peg hook having a bracket disposed at a rear end of the sliding peg hook and a post extending from the bracket,
wherein the bracket is configured to receive the rail to detachably couple the elongate peg hook to the shelf assembly base frame.

6. The shelf assembly of claim 1, further comprising: a divider tray having a plurality of settings for a modular reconfiguration, the divider tray being detachably coupled to the shelf assembly base frame.

7. The shelf assembly of claim 6, further comprising:
a front retaining wall extending upwardly from a front edge of the divider tray;
a rear retaining wall extending upwardly from a rear edge of the divider tray; and
a divider extending from the front retaining wall to the rear retaining wall of the divider tray.

8. The shelf assembly of claim 7, further comprising:
a first alignment slot disposed at the front retaining wall; and
a second alignment slot disposed at the rear retaining wall, configured to selectively fix a position of the divider with respect to the front retaining wall and the rear retaining wall.

9. The shelf assembly of claim 6, further comprising:
a pusher assembly having a pusher track, a coil spring, and an injection molded panel, the pusher assembly being detachably coupled to a front edge and a rear edge of the divider tray.

10. The shelf assembly of claim 9, further comprising:
a first alignment slot disposed at the front retaining wall; and
a second alignment slot disposed at the rear retaining wall, the first and second alignment slots being configured to selectively fix a position of the pusher assembly with respect to the front retaining wall and the rear retaining wall.

11. The shelf assembly of claim 1, further comprising:
a tray detachably coupled to the shelf assembly base frame, wherein a bottom surface of the tray extends downwardly beyond a bottom of the shelf assembly base frame, the tray including:
a front wall extends upwardly from the bottom surface and including a first mating area configured to detachably couple to a corresponding first mating area disposed proximate to a front edge of the shelf assembly base frame;
a plurality of side walls extending upwardly from the bottom surface;
a rear wall extending upwardly from the bottom surface and including a second mating area configured to detachable couple to a second corresponding mating area disposed proximate to a rear edge of the shelf assembly base frame; and
a divider extending from the front edge of the shelf assembly base frame to the rear edge of the shelf assembly base frame, the divider being configured to detachably couple to the tray to divide the tray into object holding areas.

12. The shelf assembly of claim 1, further comprising: a trim tray having a plurality of settings for a modular reconfiguration, the trim tray being detachably coupled to the shelf assembly base frame.

13. The shelf assembly of claim 1, further comprising:
a trim tray having a first surface extending in a horizontal plane from the front side of the shelf assembly base frame toward the rear side of the shelf assembly base frame assembly and including a first mating area configured to detachably couple to a corresponding first mating area of the shelf assembly base frame disposed proximate to the front side of the shelf assembly base frame,
the trim tray having a second surface extending in a vertical plane from the first surface wherein the second surface includes a second mating area configured to detachably couple to a corresponding second mating area of the shelf assembly base frame disposed proximate to a rear of the shelf assembly base frame;
the first and second surface configured with a plurality of alignment slots; and
a plurality of trim tray dividers extending upwardly in a vertical plane from the first surface, the trim tray dividers being configured to detachably couple to at least one of the first surface and the second surface to form horizontally offset object holding areas.

14. The shelf assembly of claim 13, further comprising:
a trim tray sub divider engaging the trim tray dividers to form vertically offset object holding areas.

15. The shelf assembly of claim 6, further comprising: a lifter tray detachably disposed between the divider tray and the shelf assembly base frame.

16. A reconfigurable shelf assembly, comprising:
a shelf assembly base frame including:
a rear side with a resilient detent member;
a plurality of walls defining a perimeter, the plurality of walls including two opposing side walls that include arms with toothed fastening members for selectively mounting the shelf assembly base frame to a wall assembly;

a first shelving component configured to support objects according to a first configuration;

a second shelving component configured to support objects according to a second configuration;

a divider tray having a plurality of settings for a modular reconfiguration, the divider tray being detachably coupled to the shelf assembly base frame;

wherein the first shelving component is detachably coupled to the shelf assembly base frame to facilitate removal and replacement of the first shelving component with the second shelving component to reconfigure the shelf assembly to support objects according to the second configuration;

wherein the resilient detent member is configured for retaining the first or second shelving components; and wherein the divider tray includes a slide roll tray further comprising:

a first vertical member and a second vertical member, the first and second vertical members having a parallel arrangement extending upwardly from opposing sidewalls of the shelf assembly base frame; and a plurality of ledges extending from the first vertical member and the second vertical member, the plurality of ledges being positioned within a perimeter of the shelf assembly base frame and having an angle wherein a rear portion of the ledge is vertical offset from a front portion of the ledge.

17. The shelf assembly of claim 6, wherein the shelf assembly base frame includes a release tab to disengage the divider tray from the shelf assembly base frame.

18. A reconfigurable shelf assembly comprising:

a shelf assembly base frame of a shelf assembly being selectively mountable to a wall assembly by at least one shelving arm with toothed fastening members associated with the shelf assembly base frame, the shelf assembly base frame including a rear side with a resilient detent member, a plurality of walls defining a perimeter, the plurality of walls including two opposing side walls wherein the at least one shelving arm extends from one of the opposing side walls, a rail extending proximate to the rear side of the shelf assembly base frame, and a slot in a front side for retaining a first shelving component or a second shelving component; the opposing side walls extending between the rear side and the front side; and a plurality of object support structures, the plurality of object support structures configurable to define a plurality of different object holding areas, each of the plurality of object support structures including a mating area, the mating area of each of the object support structures being configured to mate with a corresponding mating area of the shelf assembly base frame to interchangeably couple the object support structures to the shelf assembly base frame, the object holding area of each of the object support structures having a configuration for holding objects relative to the shelf assembly base frame.

19. The reconfigurable shelf assembly of claim 18, wherein at least one of the object support structures has a channel proximate to the front side of the shelf assembly base frame and the shelf assembly further comprises:

a brush shroud having an edge forming the second mating area and face configured to hold a brush relative to the shelf assembly base frame, wherein the channel is configured to receive the edge to detachably couple the brush shroud to the shelf assembly base frame.

20. The reconfigurable shelf assembly of claim 18, wherein the shelf assembly further comprises:

an elongate peg hook having a bracket disposed at a rear end of the sliding peg hook and a post extending from the bracket, wherein the bracket is configured to receive the rail to detachably couple the elongate peg hook to the shelf assembly base frame.

21. The reconfigurable shelf assembly of claim 18, wherein an object support structure further comprises: a plurality of settings for a modular reconfiguration, the object support structure being detachably coupled to the shelf assembly base frame.

22. The reconfigurable shelf assembly of claim 18, further comprising:

a front retaining wall extending upwardly from a front edge of the object support structure;

a rear retaining wall extending upwardly from a rear edge of the object support structure;

a divider extending from the front retaining wall to the rear retaining wall of the object support structure.

23. The reconfigurable shelf assembly of claim 18, further comprising a lifter tray detachably disposed between the object support structure and the shelf assembly base frame.

24. The reconfigurable shelf assembly of claim 18, wherein the object support structure includes a slide roll tray further comprising:

a first and a second vertical member having a parallel arrangement configured to extend upward from the opposing sidewalls of the shelf assembly base frame; and a plurality of ledges extending from the first vertical member and the second vertical member, positioned within the perimeter of the shelf assembly base frame, having an angle wherein the rear portion of the ledge is vertical higher than the front portion of the ledge.

25. The shelf assembly of claim 1, wherein the rail includes at least one mating area configured to receive at least one mating member of the first shelving component or the second shelving component.

* * * * *